(12) United States Patent
Kimura

(10) Patent No.: US 9,209,890 B2
(45) Date of Patent: Dec. 8, 2015

(54) RELAY STATION, RELAY METHOD, AND WIRELESS COMMUNICATION DEVICE

(75) Inventor: Ryota Kimura, Tokyo (JP)

(73) Assignee: Sony Corporation, Tokyo (JP)

( * ) Notice: Subject to any disclaimer, the term of this patent is extended or adjusted under 35 U.S.C. 154(b) by 123 days.

(21) Appl. No.: 13/394,726

(22) PCT Filed: Sep. 2, 2010

(86) PCT No.: PCT/JP2010/065049
§ 371 (c)(1),
(2), (4) Date: Mar. 9, 2012

(87) PCT Pub. No.: WO2011/033944
PCT Pub. Date: Mar. 24, 2011

(65) Prior Publication Data
US 2012/0170481 A1 Jul. 5, 2012

(30) Foreign Application Priority Data
Sep. 18, 2009 (JP) ................. 2009-217343

(51) Int. Cl.
*H04L 12/54* (2013.01)
*H04B 7/155* (2006.01)
*H04L 5/00* (2006.01)
(Continued)

(52) U.S. Cl.
CPC .......... *H04B 7/15542* (2013.01); *H04L 5/0044* (2013.01); *H04L 5/0053* (2013.01); *H04L 5/0064* (2013.01); *H04L 27/2602* (2013.01); *H04W 84/047* (2013.01)

(58) Field of Classification Search
CPC .. H04W 88/04; H04W 72/0406; H04W 24/00

USPC ......... 370/252, 328–330, 335–338, 342–344, 370/345, 352–356, 400, 428, 436–437, 370/441–442, 478–480
See application file for complete search history.

(56) References Cited

U.S. PATENT DOCUMENTS

| 7,720,020 | B2 * | 5/2010 | Larsson ........................ 370/315 |
| 8,340,676 | B2 * | 12/2012 | Nory et al. .................... 455/450 |
| 8,724,574 | B2 * | 5/2014 | Yang et al. .................... 370/329 |

(Continued)

FOREIGN PATENT DOCUMENTS

| CN | 101142768 A | 3/2008 |
| EP | 2017976 A1 | 1/2009 |

(Continued)

OTHER PUBLICATIONS

U.S. Appl. No. 13/394,726, filed Mar. 9, 2012, Kimura.

(Continued)

*Primary Examiner* — Kevin Mew
(74) *Attorney, Agent, or Firm* — Sony Corporation

(57) ABSTRACT

To dynamically change an amount of communication resources to be used for relay communication. A relay station for relaying a radio signal between a base station and a mobile station is provided. The relay station includes a wireless communication unit for transmitting or receiving a radio signal in blocks individually divided in at least one of a time domain, a frequency domain, a code domain, and a space domain, and a communication control unit for causing the wireless communication unit to transmit, in one block, data contained in two or more radio signals received in different blocks by the wireless communication unit.

19 Claims, 27 Drawing Sheets

(51) Int. Cl.
*H04L 27/26* (2006.01)
*H04W 84/04* (2009.01)

(56) References Cited

U.S. PATENT DOCUMENTS

| | | | |
|---|---|---|---|
| 9,030,977 B2* | 5/2015 | Chen et al. | 370/310 |
| 2005/0122928 A1* | 6/2005 | Vijayan et al. | 370/312 |
| 2005/0232183 A1* | 10/2005 | Sartori et al. | 370/319 |
| 2008/0192724 A1* | 8/2008 | Kondo et al. | 370/345 |
| 2008/0268785 A1* | 10/2008 | McCoy et al. | 455/67.11 |
| 2009/0116423 A1* | 5/2009 | Ni et al. | 370/315 |
| 2009/0168709 A1* | 7/2009 | Hole et al. | 370/329 |
| 2009/0196177 A1* | 8/2009 | Teyeb et al. | 370/231 |
| 2009/0227201 A1* | 9/2009 | Imai et al. | 455/7 |
| 2010/0077274 A1* | 3/2010 | Kim et al. | 714/750 |
| 2010/0098045 A1* | 4/2010 | Miyazaki | 370/342 |
| 2011/0044295 A1* | 2/2011 | Li et al. | 370/336 |
| 2011/0098045 A1* | 4/2011 | Moe et al. | 455/435.1 |
| 2011/0142013 A1* | 6/2011 | Manssour et al. | 370/336 |
| 2011/0182231 A1* | 7/2011 | Wang et al. | 370/315 |
| 2012/0213147 A1* | 8/2012 | Noh et al. | 370/315 |
| 2013/0028238 A1* | 1/2013 | Kim et al. | 370/336 |
| 2013/0102304 A1* | 4/2013 | Lee et al. | 455/422.1 |

FOREIGN PATENT DOCUMENTS

| | | |
|---|---|---|
| EP | 2066084 A1 | 6/2009 |
| JP | 2007-221527 | 8/2007 |
| JP | 2007-312244 | 11/2007 |
| JP | 2008 193240 | 8/2008 |
| JP | 2008 199332 | 8/2008 |
| WO | 2006 098273 | 9/2006 |
| WO | 2009 090877 | 7/2009 |

OTHER PUBLICATIONS

U.S. Appl. No. 13/497,945, filed Mar. 23, 2012, Kimura.
International Search Report Issued Sep. 28, 2010 in PCT/JP10/65049 Filed Sep. 2, 2010.
Office Action issued May 13, 2014 in Japanese Patent Application No. 2011-531883.
Combined Chinese Office Action and Search Report issued Mar. 7, 2014 in Patent Application No. 201080040090.7 (with English language translation).
Office Action issued on Dec. 9, 2014 in Japanese Patent Application No. 2011-531883.
Extended European Search Report issued on Oct. 14, 2015 in patent application No. 10817057.2.

* cited by examiner

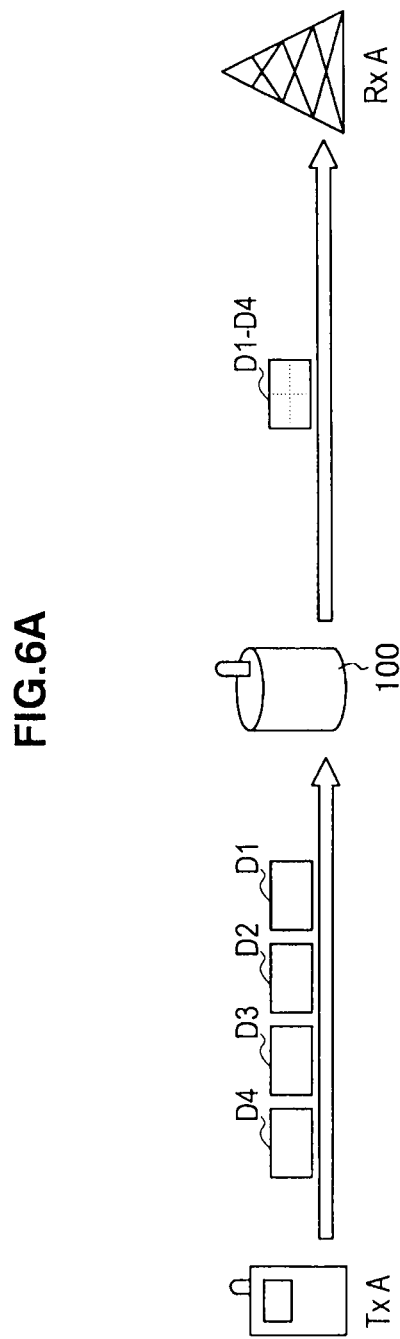

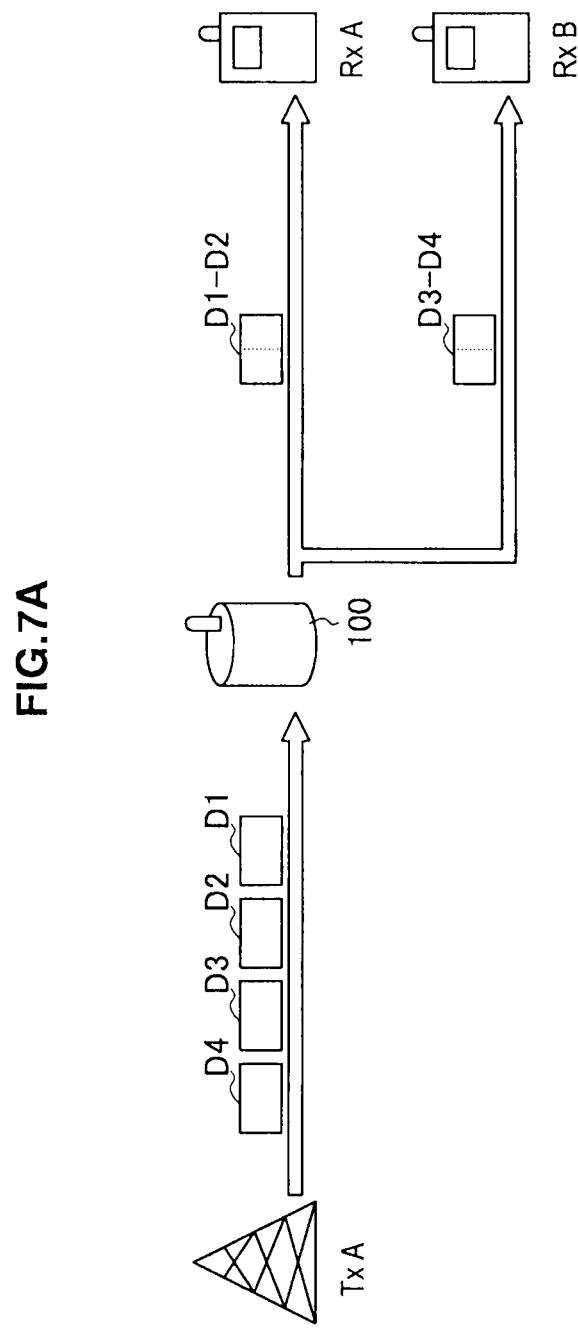

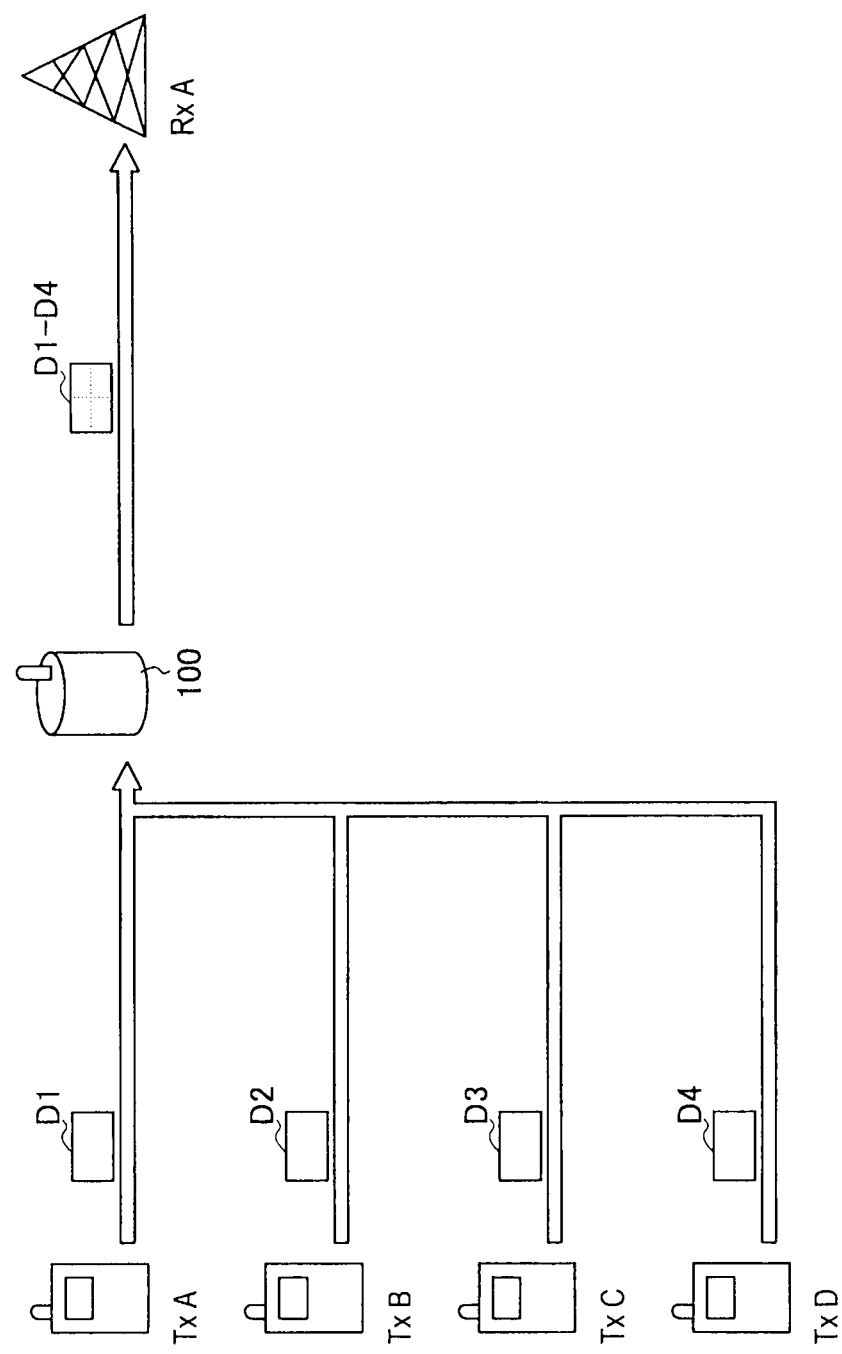

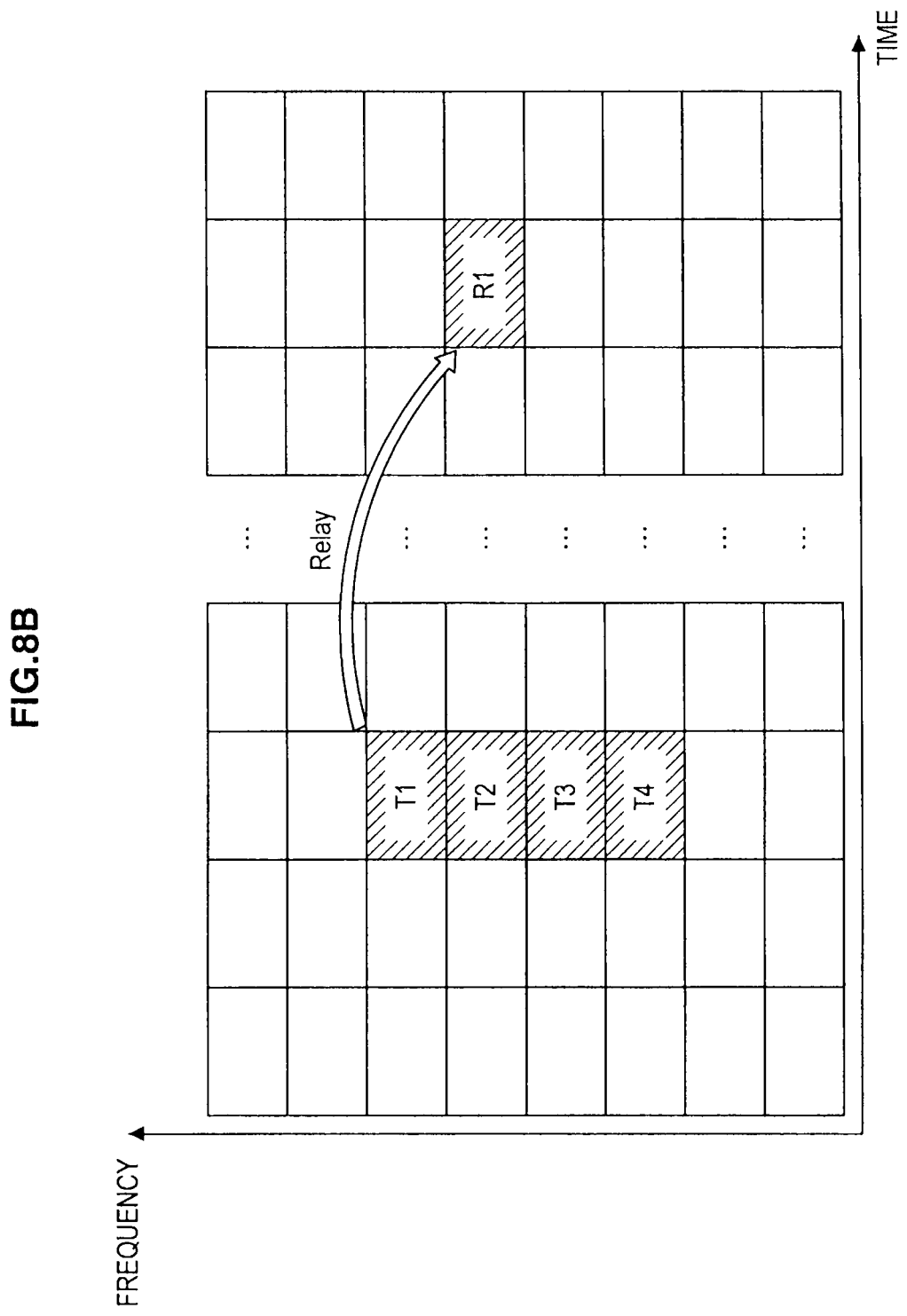

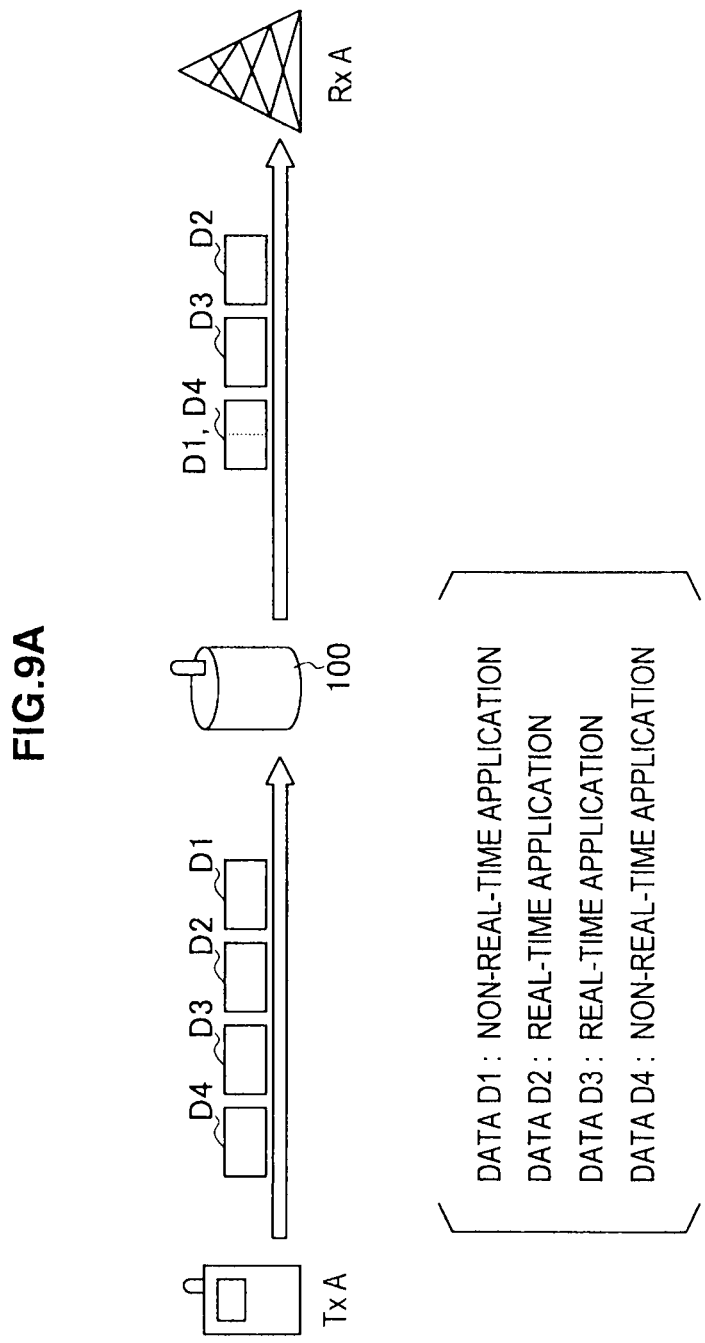

FIG.9C

| QCI | RESOURCE TYPE | PRIORITY | PACKET DELAY BUDGET | PACKET LOSS RATE | EXAMPLE OF APPLICATION |
|---|---|---|---|---|---|
| 1 | ASSURANCE OF BIT RATE | 2 | 100 msec | $10^{-2}$ | TELEPHONE CALL |
| 2 | | 4 | 150 msec | $10^{-3}$ | LIVE STREAMING |
| 3 | | 3 | 50 msec | $10^{-3}$ | REAL-TIME GAME |
| 4 | | 5 | 300 msec | $10^{-6}$ | BUFFERING STREAMING |
| 5 | NON-ASSURANCE OF BIT RATE | 1 | 100 msec | $10^{-6}$ | IP MULTIMEDIA SYSTEM SIGNALING |
| 6 | | 6 | 300 msec | $10^{-6}$ | Web ACCESS E-MAIL |
| 7 | | 7 | 100 msec | $10^{-3}$ | BIDIRECTIONAL GAME |
| 8 | | 8 | 300 msec | $10^{-6}$ | Web ACCESS E-MAIL |
| 9 | | 9 | | | |

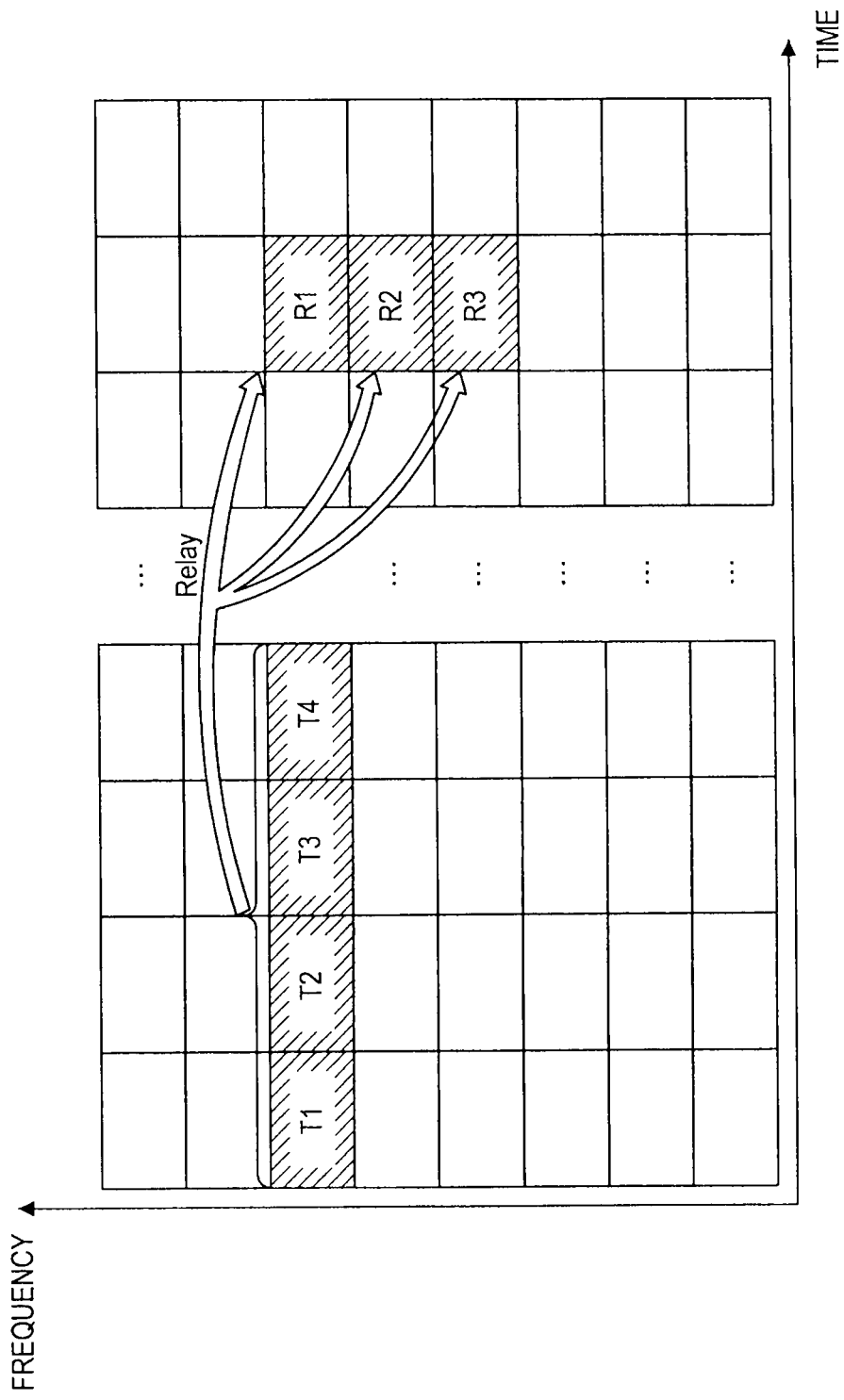

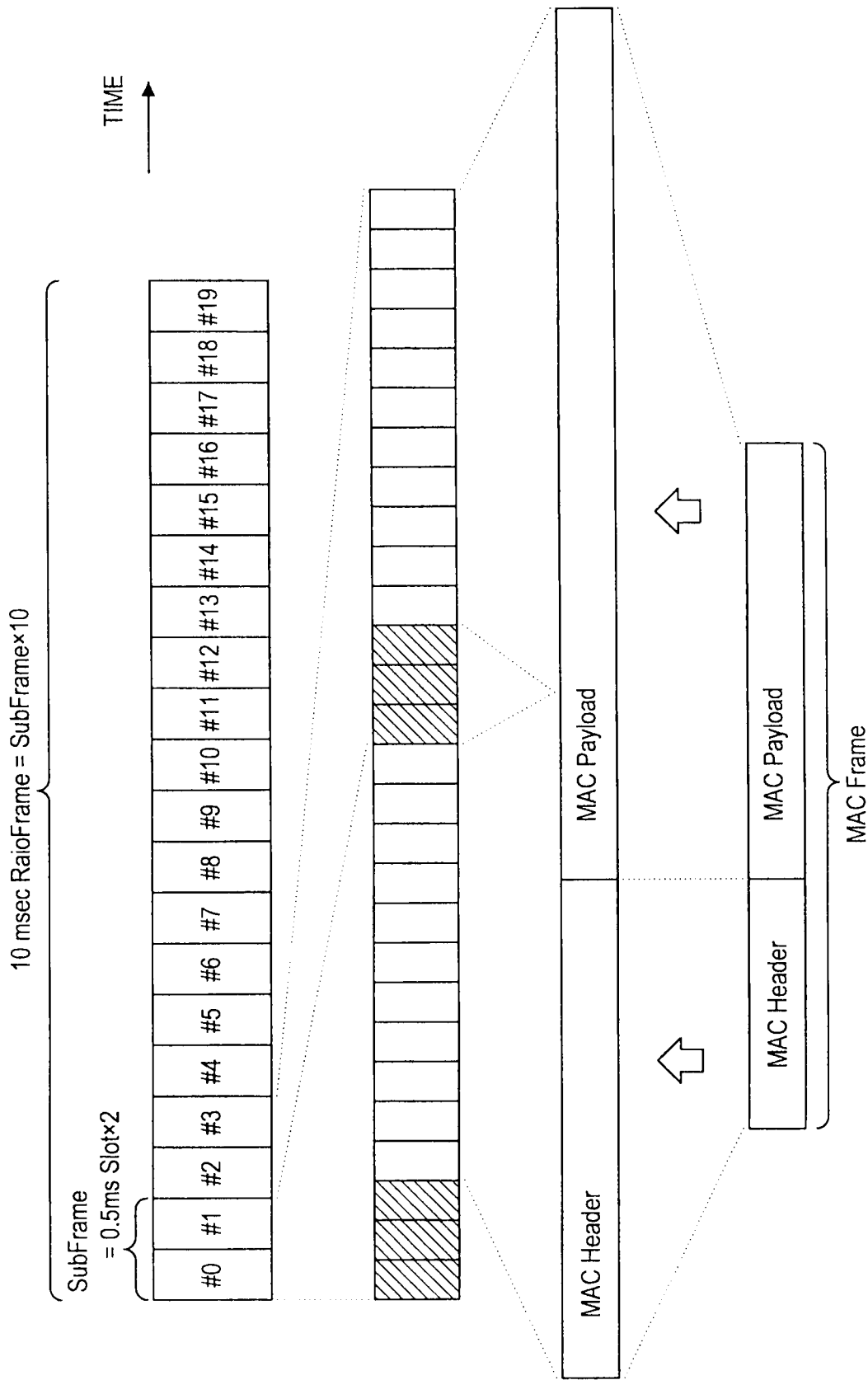

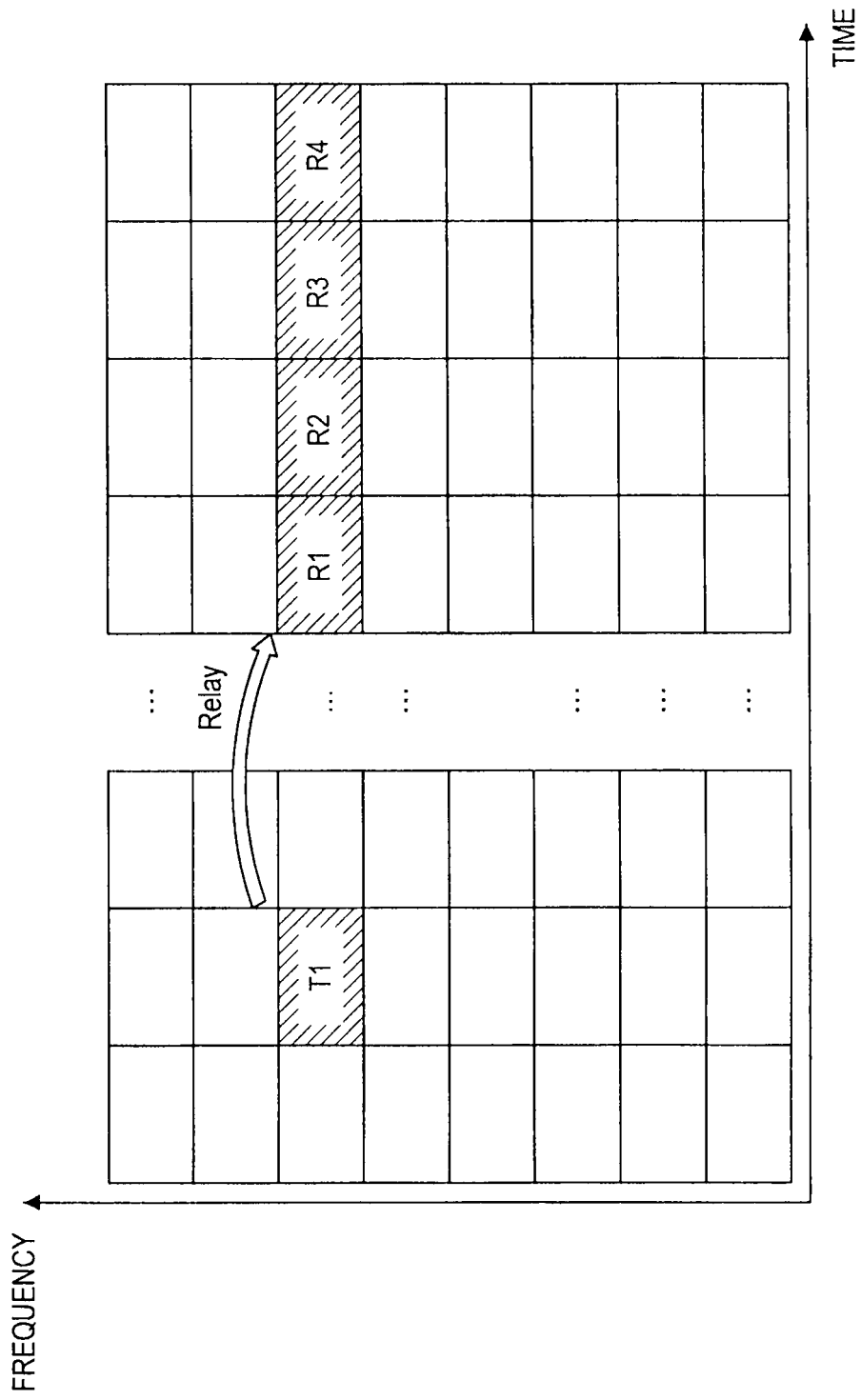

RELAY STATION, RELAY METHOD, AND WIRELESS COMMUNICATION DEVICE

TECHNICAL FIELD

The present invention relates to a relay station, a relay method, and a wireless communication device.

BACKGROUND ART

In a wireless communication system, a size of a geographical area where service can be provided, that is, a size of coverage of the system, is one important concern. In order to extend the coverage of the system, it is important to overcome an influence of attenuation of an electric wave used for radio communication since the electric wave is spatially attenuated due to a propagation distance, presence of an obstacle, reflection, scattering, or the like.

One technique for extending the coverage of the wireless communication system is to relay a radio signal via a relay station, that is, is relay communication. In relay communication, a relay station is located between two communication devices that are unable (or difficult) to directly transmit or receive a radio signal, and the radio signal is relayed by the relay station. For example, improving throughput in a cell edge by utilizing relay communication of the relay station in LTE (Long Term Evolution)-Advanced, which is a next generation cellular communication standard examined in 3GPP (Third Generation Partnership Project), has been proposed.

Examples of techniques related to relay communication include Patent Literatures 1 and 2 below. A technique of applying a frame aggregation technique to a relay communication technique to improve throughput in relay communication is disclosed in Patent Literature 1. Similarly, a technique of suppressing increase of a delay time and a packet error rate caused by relaying, by the relay station integrating and relaying a plurality of packets, is disclosed in Patent Literature 2.

Here, in relay communication, there are generally two types of links, i.e., a first link between a relay source node (source node) and a relay station, and a second link between the relay station and a relay destination node (destination node). The relay station receives a radio signal transmitted from the relay source node via the first link, and transmits the received radio signal to the relay destination node via the second link. In both of the techniques disclosed in Patent Literatures 1 and 2, a plurality of MAC (Media Access Control) frames or packets received via the first link is integrated into one MAC frame or packet and relayed to the second link.

CITATION LIST

Patent Literature

Patent Literature 1: Japanese Patent Application Laid-Open No. 2007-312244
Patent Literature 2: Japanese Patent Application Laid-Open No. 2007-221527

SUMMARY OF INVENTION

Technical Problem

However, link qualities of a first link and a second link in relay communication are likely to be different from each other. If communication resources of amounts according to the respective link qualities can be allocated to the first link and the second link when the link qualities of the two links are different, use efficiency of the communication resources of the overall system is improved. In this regard, the aggregation technique disclosed in Patent Literature 1 or 2 may improve throughput through reduction of overhead, but does not perform aggregation based on units for division of communication resources, which still leaves room to improve use efficiency of the communication resources.

Generally, communication resources of a wireless communication system are divided in a time domain, a frequency domain, a code domain, a space domain or the like according to a multiple access scheme employed by the system. Accordingly, there is a need for a relay station capable of dynamically changing an amount of communication resources used for relay communication to be suitable for units of such division of the communication resources.

An object of the present invention is to provide a relay station, a relay method, and a wireless communication device that are novel and improved and capable of dynamically changing an amount of communication resources to be used in relay communication.

Solution to Problem

According to a certain embodiment of the present invention, there is provided a relay station for relaying a radio signal between a base station and a mobile station, the relay station including: a wireless communication unit for transmitting or receiving a radio signal in blocks individually divided in at least one of a time domain, a frequency domain, a code domain, and a space domain; a communication control unit for causing the wireless communication unit to transmit, in one block, data contained in two or more radio signals respectively received in different blocks by the wireless communication unit.

According to such a configuration, when a radio signal is relayed between a base station and a mobile station (i.e., when relay communication is performed), the relay station can use a smaller number of blocks than the number of blocks used in reception of a radio signal from a relay source, in transmission of data contained in the radio signal to the relay destination.

Further, the communication control unit may cause the wireless communication unit to transmit, in the one block, data contained in the radio signals for which relay destinations are common among the radio signals respectively received in the different blocks by the wireless communication unit.

Further, the relay station may further include a measurement unit for measuring link quality between the relay station and the base station and link quality between the relay station and the mobile station, and the communication control unit may cause the wireless communication unit to transmit, in the one block, data contained in the two or more radio signals when the link quality between the relay station and the relay destination is higher than the link quality between the relay station and the relay source.

Further, the blocks may be individually divided in both the time domain and the frequency domain.

Further, the communication control unit may change the number of blocks to be used when causing the wireless communication unit to transmit the data contained in the radio signal, according to a type of an application associated with each radio signal.

Further, the communication control unit may cause the wireless communication unit to transmit data contained in a radio signal related to an application requiring real time, using as many blocks as in reception.

Further, the two or more radio signals may be radio signals respectively transmitted from different relay sources.

Further, the communication control unit may determine which blocks to use to cause the wireless communication unit to transmit the data contained in the two or more radio signals based on scheduling information received from the base station by the wireless communication unit.

Further, the communication control unit may determine the number of blocks to be used when causing the wireless communication unit to transmit the data contained in the two or more radio signals based on a scheduling request received from the mobile station by the wireless communication unit.

Further, when transmitting the data contained in the two or more radio signals in the one block, the wireless communication unit may encode and modulate data obtained by demodulating and decoding the two or more radio signals according to different encoding schemes or different modulation schemes and transmit the resultant data.

Further, the communication control unit may receive the scheduling information on a control channel provided for the mobile station or on a relay control channel provided for the relay station.

Further, according to another embodiment of the present invention, there is provided a relay method for relaying a radio signal between a base station and a mobile station, wherein: the radio signal is transmitted in blocks individually divided in at least one of a time domain, a frequency domain, a code domain, and a space domain, and the relay method includes steps of: receiving, by the relay station, two or more radio signals in different blocks; and transmitting, by the relay station, data contained in the two or more received radio signals in one block.

Further, according to another embodiment of the present invention, there is provided a wireless communication device for transmitting and receiving a radio signal to and from one or more other wireless communication devices via a relay station, the wireless communication device including: a wireless communication unit for transmitting or receiving a radio signal in blocks individually divided in at least one of a time domain, a frequency domain, a code domain, and a space domain; and a communication control unit for causing the wireless communication unit to receive data contained in two or more radio signals transmitted in different blocks from the one or more other wireless communication devices to the relay station, the data being data contained in the radio signal relayed in one block by the relay station.

Further, according to another embodiment of the present invention, there is provided a relay station for relaying a radio signal between a base station and a mobile station, the relay station including: a wireless communication unit for transmitting or receiving a radio signal in blocks individually divided in at least one of a time domain, a frequency domain, a code domain, and a space domain; and a communication control unit for causing the wireless communication unit to transmit, in two or more different blocks, data contained in the radio signal received in one block by the wireless communication unit.

According to such a configuration, when a radio signal is relayed between a base station and a mobile station (i.e., when relay communication is performed), the relay station can use a greater number of blocks than the number of blocks used in reception of a radio signal from a relay source, in transmission of data contained in the radio signal to the relay destination.

Further, when the data contained in the radio signal received in one block by the wireless communication unit contains two or more data for which relay destinations are different, the communication control unit may cause the wireless communication unit to transmit the two or more data in two or more different blocks.

Further, the relay station may further include a measurement unit for measuring link quality between the relay station and the base station and link quality between the relay station and the mobile station, and the communication control unit may cause the wireless communication unit to transmit, in the two or more blocks, the data contained in the radio signal received in the one block when link quality between the relay station and the relay destination is lower than link quality between the relay station and the relay source.

Further, the blocks may be individually divided in both the time domain and the frequency domain.

Further, according to another embodiment of the present invention, there is provided a relay method for relaying a radio signal using a relay station between a base station and a mobile station, wherein: the radio signal is transmitted in blocks individually divided in at least one of a time domain, a frequency domain, a code domain, and a space domain, and the relay method includes steps of: receiving, by the relay station, the radio signal in one block; and transmitting, by the relay station, data contained in the received radio signal in two or more different blocks.

Further, according to another embodiment of the present invention, there is provided a wireless communication device for transmitting and receiving a radio signal to and from one or more other wireless communication devices via a relay station, the wireless communication device including: a wireless communication unit for transmitting or receiving the radio signal in blocks individually divided in at least one of a time domain, a frequency domain, a code domain, and a space domain; and a communication control unit for causing the wireless communication unit to transmit, in one block, two or more data to be respectively relayed in different blocks to the one or more other wireless communication devices by the relay station, to the relay station.

Further, according to another embodiment of the present invention, there is provided a relay station for relaying a radio signal between a base station and a mobile station, the relay station including: a wireless communication unit for transmitting or receiving a radio signal in blocks individually divided in at least one of a time domain, a frequency domain, a code domain, and a space domain; and a communication control unit for causing the wireless communication unit to transmit data in two or more different blocks in a second domain rather than a first domain, the data being contained in two or more radio signals respectively received in different blocks by the wireless communication unit in the first domain.

Advantageous Effects of Invention

As described above, according to the relay station, the relay method, and the wireless communication device in the present invention, it is possible to dynamically change an amount of communication resources to be used in relay communication.

BRIEF DESCRIPTION OF DRAWINGS

FIG. 6A is an illustrative diagram illustrating a first scenario for integration of communication resources.

FIG. 7A is an illustrative diagram illustrating a second scenario for integration of communication resources.

FIG. 8A is an illustrative diagram illustrating a third scenario for integration of communication resources.

FIG. 8B is an illustrative diagram illustrating resource blocks used in the third scenario for integration of communication resources.

FIG. 9A is an illustrative diagram illustrating a fourth scenario for integration of communication resources.

FIG. 9C is a table showing an example of information that may be used to identify a type of an application in the fourth scenario for integration of communication resources.

FIG. 10B is an illustrative diagram illustrating resource blocks used in the fifth scenario for integration of communication resources.

FIG. 11 is an illustrative diagram showing an example of a frame structure when a data frame received in one resource block is divided into a plurality of resource blocks.

FIG. 13B is an illustrative diagram illustrating resource blocks used in the first scenario for division of communication resources.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Further, the "Description of Embodiments" will be described in the following order.

1. Overview of Wireless Communication System According to Embodiment
2. Exemplary Configuration of Relay Station According to Embodiment
   2-1. Exemplary Configuration of Device
   2-2. Integration of Communication Resources
   2-3. Division of Communication Resources
   2-4. Arrangement Change of Communication Resources
3. Example of Scheduling Process
4. Exemplary Configuration of Mobile Station and Base Station
5. Conclusion

1. OVERVIEW OF WIRELESS COMMUNICATION SYSTEM ACCORDING TO EMBODIMENT

First, an overview of a wireless communication system according to an embodiment of the present invention will be described with reference to FIGS. 1 to 3.

(Exemplary Configuration of System)

Figure 1:
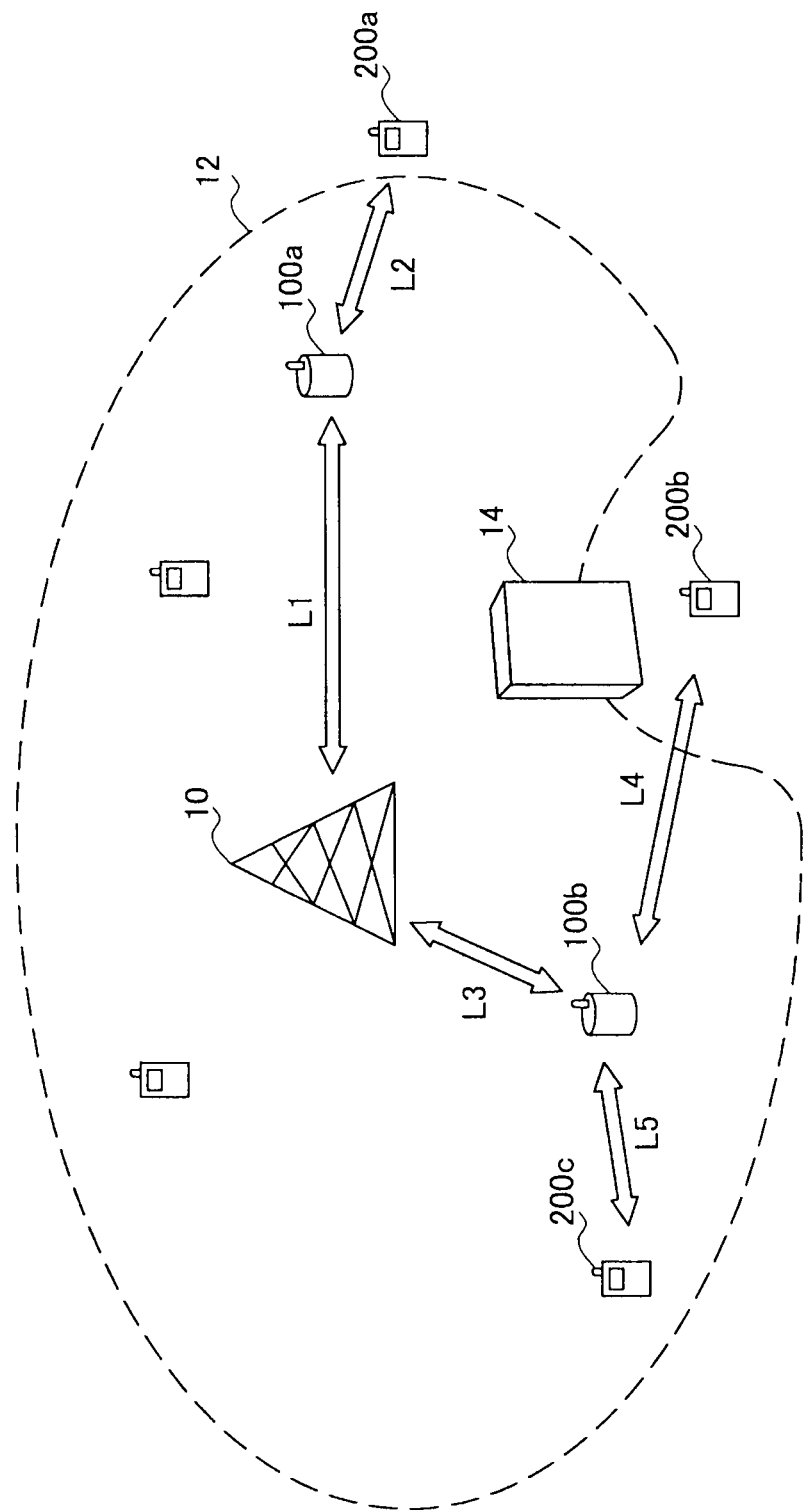
FIG. 1 is an illustrative diagram illustrating an overview of a wireless communication system according to an embodiment.

FIG. 1 is an illustrative diagram illustrating an overview of a wireless communication system 1 according to an embodiment of the present invention. Referring to FIG. 1, the wireless communication system 1 includes a base station 10 for providing communication service in an area 12. Further, a plurality of wireless communication devices for using the communication service provided by the base station 10 is shown in the area 12. The plurality of wireless communication devices, for example, includes relay stations 100a and 100b. Further, mobile stations 200a, 200b and 200c are shown in or around the area 12.

Each of the relay stations 100a and 100b is a wireless communication device serving to relay a radio signal between the base station 10 and any of the mobile stations (i.e., to execute relay communication). The relay station 100a or 100b may be, for example, a small base station or a wireless access point for forming a femto cell, or a mobile station such as a mobile terminal having a function of relaying a radio signal.

In the example of FIG. 1, for example, the mobile station 200a is located in the vicinity of the area 12 (i.e., a cell edge) and distant from the base station 10. Accordingly, it is difficult for the mobile station 200a to directly transmit or receive the radio signal to and from the base station 10. In this case, the relay station 100a located between the mobile station 200a and the base station 10 relays the radio signal between the two nodes. This enables the mobile station 200a to communicate, for example, with another mobile station using the communication service provided by the base station 10.

Further, in the example of FIG. 1, for example, since an obstacle 14 shields a radio wave from the base station 10, the mobile station 200b cannot directly transmit or receive a radio signal to or from the base station 10. In this case, the relay station 100b located on a path bypassing the obstacle 14 relays a radio signal between the two nodes. This enables the mobile station 200b to communicate, for example, with another mobile station using the communication service provided by the base station 10. Further, the relay station may relay a radio signal transmitted from a plurality of mobile stations or to the plurality of mobile stations. In the example of FIG. 1, the relay station 100b may relay a radio signal between the base station 10 and the mobile stations 200b and 200c.

(Exemplary Configuration of Communication Resources)

Here, generally, in a wireless communication system in which the plurality of mobile stations as illustrated in FIG. 1 participates in communication, communication resources of the system are divided according to a multiple access scheme employed by the system. For example, in a TDMA (Time Division Multiple Access) scheme, a plurality of time slots individually divided in a time domain is prepared, and each mobile station performs communication using any of the time slots. Further, for example, in an FDMA (Frequency Division Multiple Access) scheme, a plurality of frequency slots divided separately in a frequency domain is prepared, and each mobile station performs communication using any of the frequency slots. Further, an OFDMA (Orthogonal Frequency Division Multiple Access) scheme may be considered one type of the FDMA scheme, and multiple access is realized using orthogonal subcarriers densely arranged in the frequency domain. Further, for example, in a CDMA (Code Division Multiple Access) scheme, individual code (spread code or frequency hopping pattern) prepared in a code domain is allocated to each mobile station, and the mobile station performs communication using the allocated code. Further, for example, in an SDMA (Space Division Multiple Access) scheme, communication resources are divided in a space domain, and multiple access is realized by a difference between directivities of antennas directed to respective mobile stations.

Figure 2:
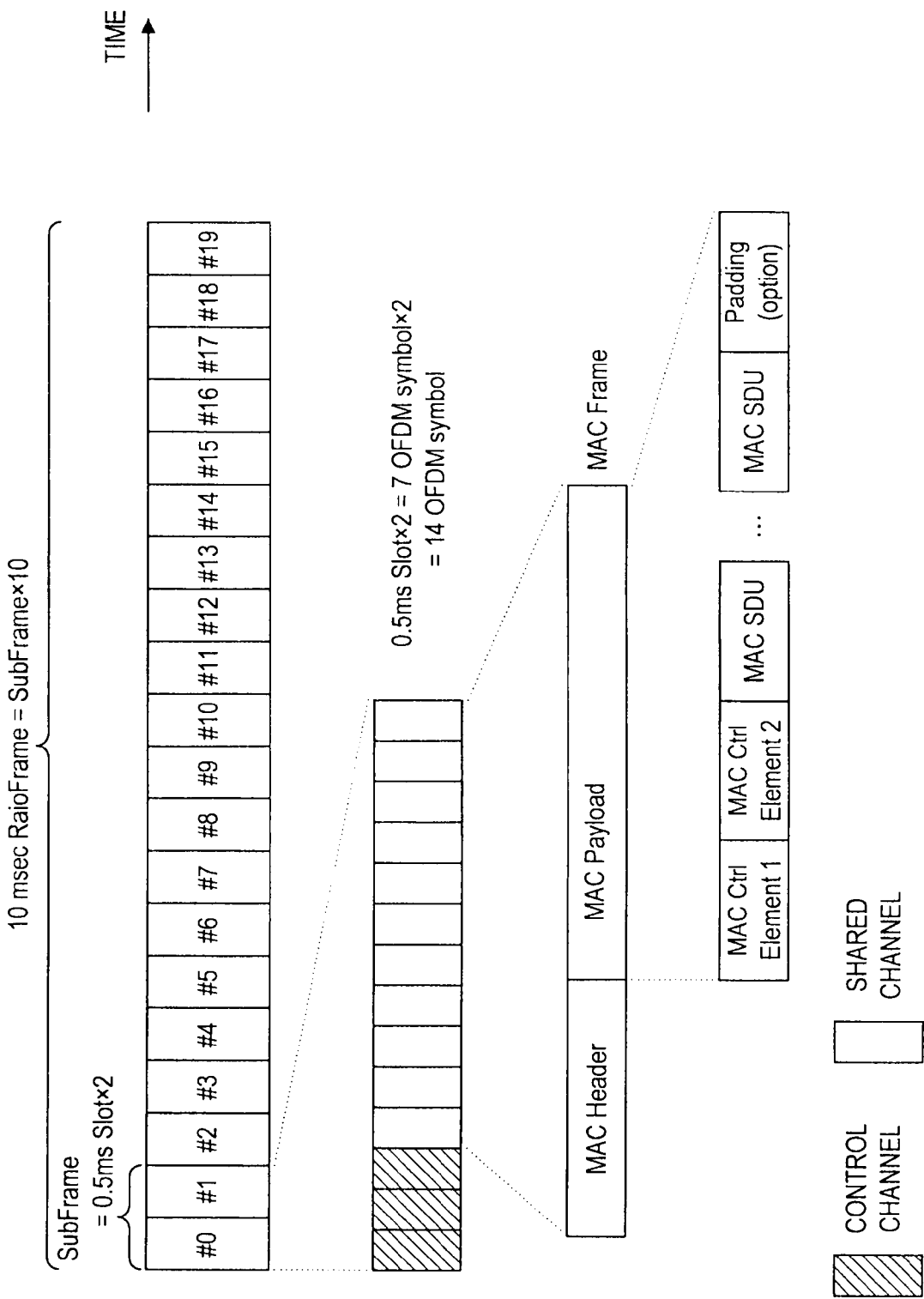
FIG. 2 is an illustrative diagram illustrating an example of communication resources divided in a time domain.

FIG. 2 shows an example of communication resources divided in a time domain and is an illustrative diagram illustrating a frame structure defined in an LTE employing an OFDMA scheme.

Referring to FIG. 2, one radio frame having a length of 10 msec consists of 10 subframes. Further, one subframe has two 0.5-msec slots. Accordingly, one radio frame includes 20 0.5-msec slots #0 to #19. Further, when a normal cyclic prefix is used, one 0.5-msec slot includes seven OFDM symbols. Accordingly, one subframe includes 14 OFDM symbols.

In this structure of the communication resources, allocation of the resources in the LTE is performed in which one subframe (14 OFDM symbols) or one 0.5-msec slot (7 OFDM symbols) is used as one unit (resource block) for allocation of the communication resources. Further, although not shown, one resource block in a frequency domain typically occupies 12 OFDM subcarriers.

As in the example of FIG. 1, when one subframe is one resource block, 14 OFDM symbols included in the subframe are allocated to control channels or shared channels. Among them, the control channels are used to deliver, for example, scheduling information notifying of allocation of the communication resources or information on a modulation scheme or an encoding scheme. The information is used for reception, demodulation and decoding of a radio signal. In the LTE, the number of OFDM symbols of the control channel included in one resource block may be any of 1 to 3. For example, when the control channel consists of 3 symbols, data is stored in the shared channel including 11 other symbols. More specifically, a frame (e.g., a MAC frame) consisting of a header and a payload, which is transmitted from an upper layer, is stored in the shared channel. For example, a plurality of MAC control elements (MAC Control Elements), a plurality of MAC SDUs (MAC Service Data Units), a padding unit (optional), and the like are included in the MAC payload.

From the perspective of simplification of the description, a description of a synchronization channel, a broadcast channel, and a reference signal is omitted herein. In fact, an OFDM symbol in a specific position in one radio frame may be used for such channels or signals.

As understood from the above description, for example, when the wireless communication system 1 conforms to LTE, communication between individual nodes (the base station, the relay station and the mobile station) is performed in any of resource blocks divided in a time domain and a frequency domain.

(General Relay Communication)

Figure 3:
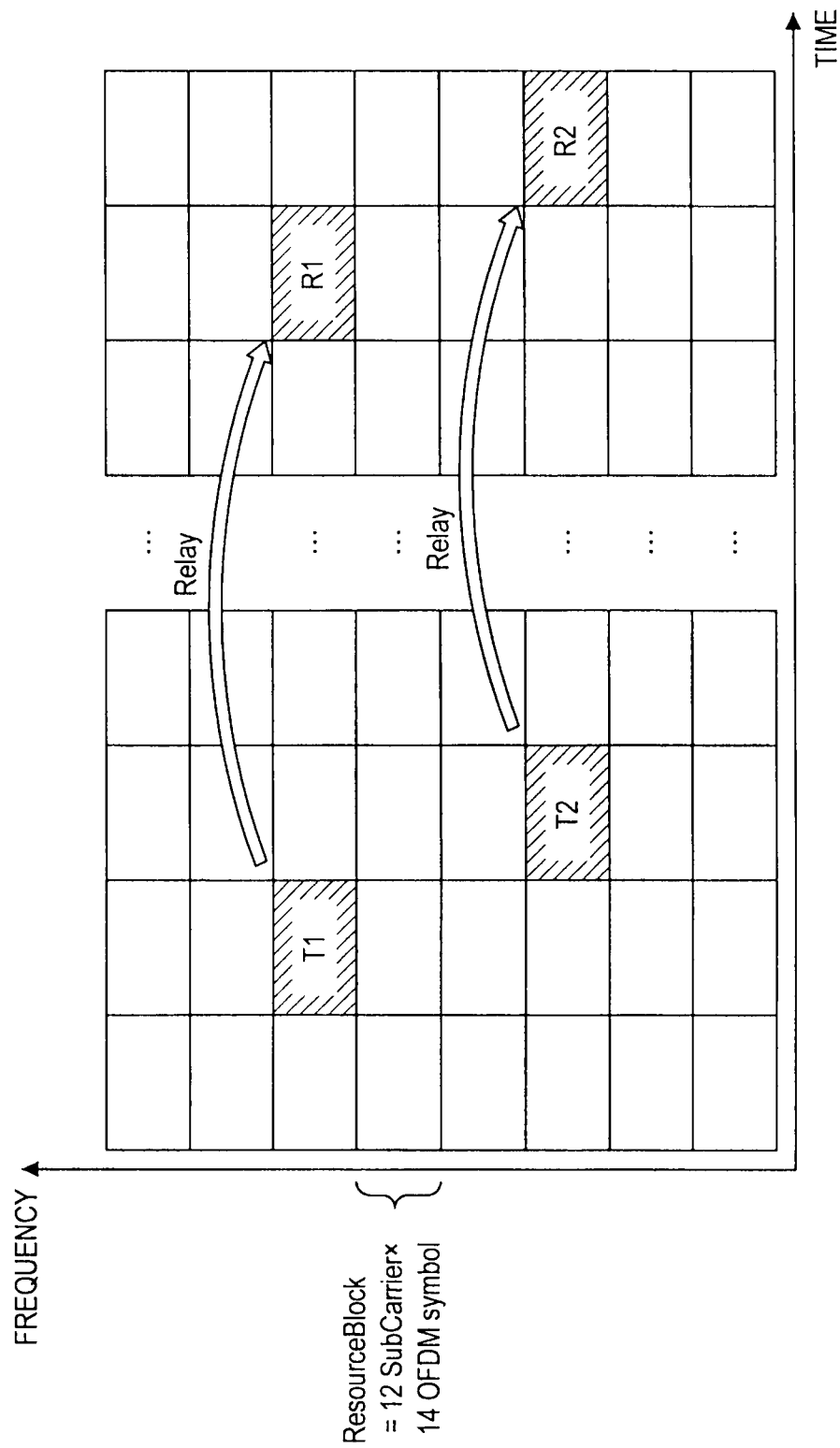
FIG. 3 is an illustrative diagram illustrating relay communication using resource blocks divided in a time domain and a frequency domain.

FIG. 3 is an illustrative diagram illustrating general relay communication performed using resource blocks divided in a time domain and a frequency domain.

Referring to FIG. 3, a diagram of a grid in which a plurality of individual squares is arranged in horizontal and vertical directions is shown. Here, a horizontal axis is a time axis and a vertical axis is a frequency axis. Each square corresponds to each of resource blocks divided in the time domain and the frequency domain. In such a structure of the communication resources, when the relay station performing general relay communication, for example, receives a radio signal from a relay source node in a resource block T1, the relay station transmits the signal to a relay destination node in the resource block R1 after a predetermined time necessary for a relay process has elapsed. Further, when the relay station, for example, receives a radio signal from a relay source node in a resource block T2, the relay station transmits the signal to a relay destination node in the resource block R2 after a predetermined time necessary for a relay process has elapsed. A resource block to be used for reception or transmission of a radio signal is typically determined by a base station to which the relay station belongs and is notified as scheduling information.

In such relay communication using the relay station, two types of communication links are involved in one relaying in the relay station, as understood from FIG. 3. A first link is a link between the relay source node and the relay station. Further, a second link is a link between the relay station and the relay destination node. For example, in the example of FIG. 1, a link L1 and a link L2 exist between the base station 10 and the mobile station 200a. A link L3 and a link L4 exist between the base station 10 and the mobile station 200b. Further, a link L3 and a link L5 exist between the base station 10 and the mobile station 200c. Typically, there is a difference in link quality between the communication links due to influence of a distance between nodes, a situation of noise or interference at a place where the node is located, fading, or the like. This implies that a communication resource amount optimal for the relay station to receive a radio signal from a relay source node is not necessarily equal to a communication resource amount optimal for the relay station to transmit the radio signal to a relay destination node. Accordingly, for example, the same amount of communication resources before and after relaying as shown in FIG. 3 is not used in relay communication, but an amount of communication resources to be used by the relay station is dynamically changed, thus improving use efficiency of the communication resources of the overall system.

As an embodiment of the present invention, a technique of dynamically changing an amount of communication resources used for relay communication using the relay station 100 will be described hereinafter in detail.

In the following description of the disclosure, in particular, when the relay stations 100a and 100b need not be distinguished from each other, last letters of the reference numerals will be omitted and collectively referred to as relay station 100. The same applies to the mobile stations 200a, 200b and 200c (mobile station 200).

Further, in the present disclosure, a description will be given on the premise of a multiple access scheme in which communication resources are divided, mainly, in a time domain and a frequency domain. However, it is understood that the present invention is not limited to such an example and may be applied to a case in which communication resources are divided in the above-described code or space domain.

2. EXEMPLARY CONFIGURATION OF RELAY STATION ACCORDING TO EMBODIMENT

[2-1. Exemplary Configuration of Device]

Figure 4:
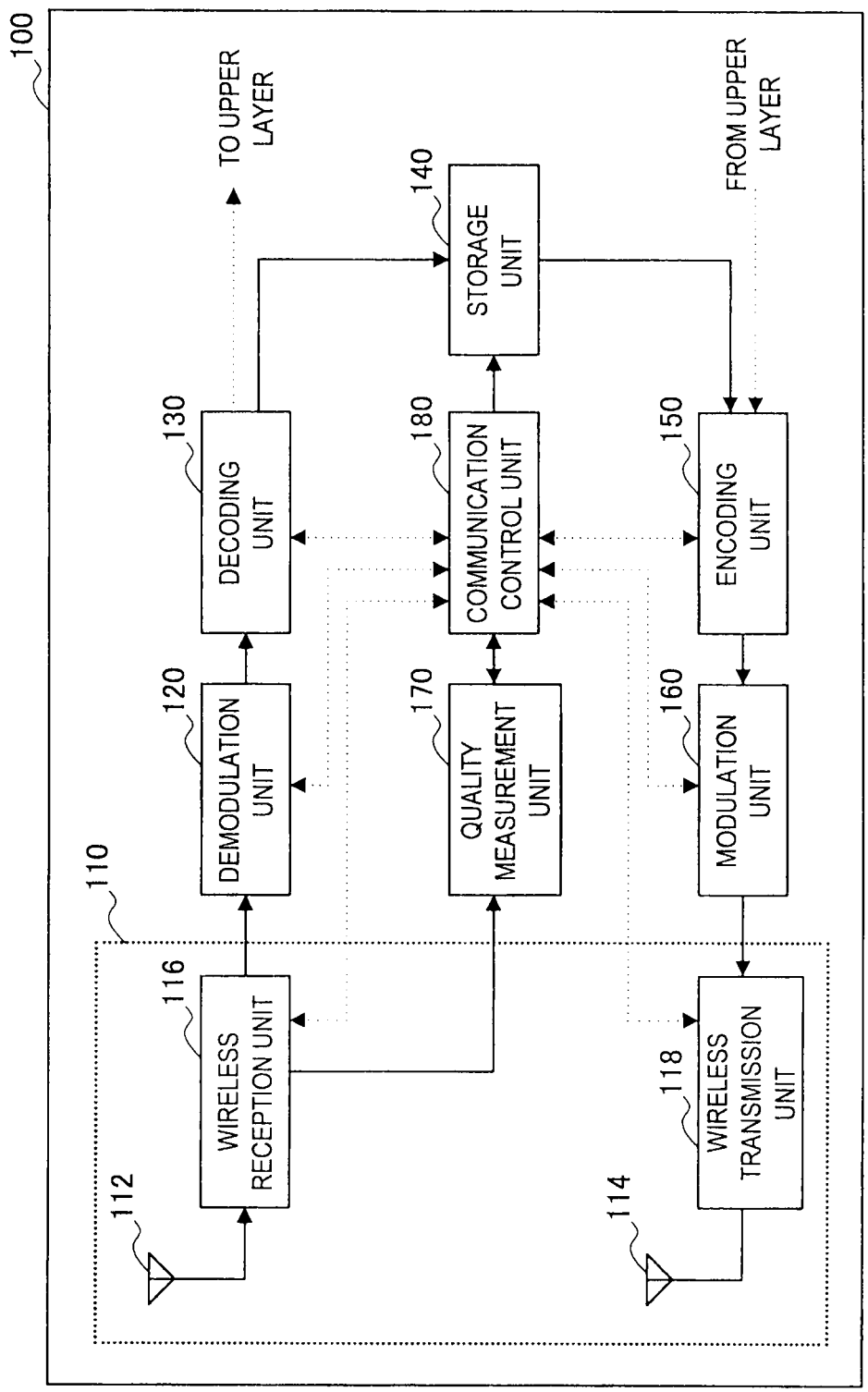
FIG. 4 is a block diagram showing an example of a configuration of a relay station according to an embodiment.

FIG. 4 is a block diagram showing an example of a configuration of the relay station 100 according to an embodiment of the present invention. Referring to FIG. 4, the relay station 100 includes a wireless communication unit 110, a demodulation unit 120, a decoding unit 130, a storage unit 140, an encoding unit 150, a modulation unit 160, a quality measurement unit 170, and a communication control unit 180. Further, the wireless communication unit 110 includes antennas 112 and 114, a wireless reception unit 116, and a wireless transmission unit 118.

In the wireless communication unit 110, the antenna 112 is connected to the wireless reception unit 116 and used to receive a radio signal. The wireless reception unit 116 typically includes an RF (Radio Frequency) circuit and a synchronization circuit. The wireless reception unit 116 amplifies a reception signal output from the antenna 112, performs frequency conversion and AD (Analogue To Digital) conversion, and then outputs the reception signal to the demodulation unit 120. Further, the wireless reception unit 116 detects synchronization by comparing a pattern of a header or a preamble included in the reception signal with a known signal pattern.

The demodulation unit 120 demodulates the reception signal, for example, according to a modulation scheme specified in information of a control channel included in the reception signal. The demodulation unit 120 outputs the demodulated reception signal to the decoding unit 130.

The decoding unit 130 decodes the reception signal, for example, according to an encoding scheme specified in the information of the control channel included in the reception signal. Thereby, a data frame (e.g., the MAC frame described with reference to FIG. 2) is acquired from the reception signal. The decoding unit 130 outputs the decoded data frame to the storage unit 140. In this case, the decoding unit 130 may perform error detection for the reception signal using error correction code according to, for example, a Viterbi algorithm. When an error is detected as a result of the error detection for the reception signal in the decoding unit 130, the relay station 100 may request retransmission from the relay source node instead of relaying the radio signal. By doing so, it is possible to avoid unnecessary consumption of communication resources between the relay station 100 and the relay destination node. Further, the decoding unit 130 may output the decoded data frame to an upper layer (e.g., a MAC layer).

The storage unit 140 temporarily stores the data frame to be relayed, which is output from the decoding unit 130, using a storage medium such as a RAM (Random Access Memory). Further, the storage unit 140 outputs the data frame stored in the storage medium to the encoding unit 150 under the control of the communication control unit 180.

The encoding unit 150 encodes the data frame input from the storage unit 140 according to a predetermined encoding scheme to generate a transmission signal under the control of the communication control unit 180. The encoding unit 150 outputs the generated transmission signal to the modulation unit 160. Further, the encoding unit 150 may encode a data frame input from an upper layer to generate a transmission signal.

The modulation unit modulates the transmission signal input from the encoding unit 150 according to a predetermined modulation scheme under the control of the communication control unit 180. The modulation unit outputs the modulated transmission signal to the wireless transmission unit 118.

The wireless transmission unit 118 typically includes an RF circuit and is connected with the transmission antenna 114. The wireless transmission unit 118 performs DA (Digital To Analogue) conversion on the transmission signal input from the modulation unit 160, performs frequency conversion and amplification, and transmits the transmission signal as a radio signal to the transmission antenna 114.

The quality measurement unit 170 measures link qualities of the communication links between the relay station and each of the relay source node and the relay destination node (e.g., the base station 10 and the mobile station 200 in FIG. 1) in relay communication in the relay station 100. The link quality may be represented, for example, by an index such as SIR (Signal to Interference Ratio), SINR (Signal to Noise and Interference Ratio), RSS (Received Signal Strength), BER (Bit Error Rate) or FER (Frame Error Rate). The quality measurement unit 170 outputs a value of the measured link quality of each communication link to the communication control unit 180. The quality measurement unit 170 may, for example, measure link quality between the base station 10 and the relay station 100 based on the reception signal from the base station 10. Alternatively, for example, the base station 10 may measure the link quality between the base station 10 and the relay station 100 and notify the quality measurement unit 170 of the relay station 100 of a measurement value. Similarly, the quality measurement unit 170, for example, may measure the link quality between the relay station 100 and the mobile station 200 based on the reception signal from the mobile station 200. Alternatively, for example, the mobile station 200 may measure the link quality between the relay station 100 and the mobile station 200 and notify the quality measurement unit 170 of the relay station 100 of a measurement value.

The communication control unit 180 controls all functions of the relay station 100 using a processing device such as a CPU (Central Processing Unit) or a DSP (Digital Signal Processor). For example, the communication control unit 180 causes the wireless reception unit 116 to receive the radio signal in blocks allocated to the communication link between the relay source node and the relay station 100 among blocks (e.g., the above-described resource blocks) individually divided in at least one of a time domain, a frequency domain, a code domain, and a space domain. Further, the communication control unit 180 causes the wireless transmission unit 118 to transmit data contained in the radio signal received by the wireless reception unit 116 in the blocks allocated to the communication link between the relay station 100 and the relay destination node. In this case, the communication control unit 180 dynamically changes blocks used in data transmission (relay), for example, according to the link quality of each communication link input from the quality measurement unit 170.

More specifically, the communication control unit 180 may cause the wireless transmission unit 118 to transmit, in one block, data contained in two or more radio signals received in different blocks. That is, the communication control unit 180 may use the communication resources in an integrated manner in relay communication. For example, the communication control unit 180 may cause wireless transmission unit 118 to transmit, in one block, data contained in radio signals for which the relay destination node is common among the radio signals received in different blocks. In particular, when the link quality between the relay station and the relay destination node is higher than the link quality between the relay station and the relay source node, the communication control unit 180 cause the modulation unit 160 to modulate the data using a higher level modulation scheme than a modulation scheme used in modulation of the reception signal. Thereby, data capacity that can be included in the same size block increases, and data contained in a plurality of blocks can be arranged in one block in an integrated manner. Five scenarios for such integration of communication resources will be described by way of example later.

Further, the communication control unit 180 may cause the wireless transmission unit 118 to transmit, in two or more different blocks, data contained in a radio signal received in one block. That is, the communication control unit 180 may divide the communication resources and use the communication resources in a multiplexing manner in relay communication. For example, when a plurality of data directed to different relay destination nodes is contained in the radio signal received in one block, the communication control unit 180 may divide the data and cause the wireless transmission unit 118 to transmit the data in different blocks. In particular, when the link quality between the relay station and the relay destination node is lower than the link quality between the relay station and the relay source node, the communication control unit 180 causes the modulation unit 160 to modulate the data using a lower level modulation scheme than the modulation scheme used in modulation of the reception signal. Thereby, reliability of communication using the same size block can be improved and data can be reliably delivered via a communication link having a relatively lower link quality. Two scenarios for such division of the communication resources will be described by way of example later.

Alternatively, the communication control unit 180 may change arrangement of communication resources for a plurality of data to relay each data, instead of integrating or dividing the communication resources in relay communication. In this case, data contained in two or more radio signals received in different blocks in a first domain (e.g., frequency domain) are transmitted in two or more different blocks in a second domain (e.g., time domain). One scenario for such a change in arrangement of the communication resources will be described by way of example later.

[2-2. Integration of Communication Resources]

Figure 5:
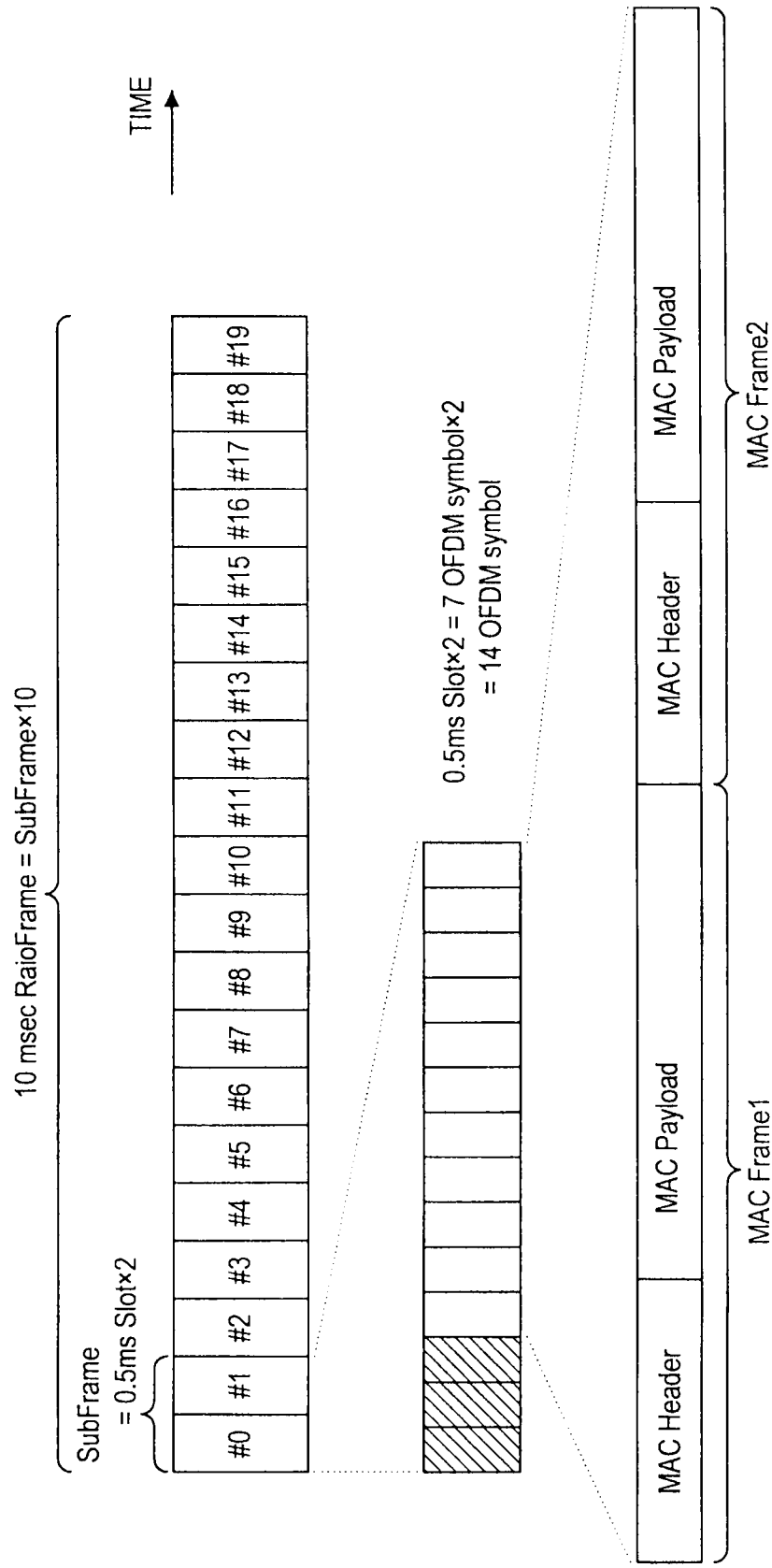
FIG. 5 shows an example of a frame structure when data frames received in a plurality of resource blocks are integrated in one resource block.

FIG. 5 shows an example of an integrated frame structure when data frames received in a plurality of resource blocks are integrated in one resource block. Referring to FIG. 5, one subframe corresponding to one resource block includes three OFDM symbols for control channels and 11 OFDM symbols for shared channels, similar to the example of FIG. 2. Further, a description of a frequency domain is omitted herein. Two MAC frames 1 and 2, each having a MAC header and a MAC payload, are included in the shared channel in the example of FIG. 5. Such a frame structure is realized by selecting, in transmission, a modulation scheme in which the number of bits per symbol is twice the bit number in reception. For example, when a modulation scheme in reception is BPSK (Binary Phase Shift Keying) and a modulation scheme in transmission is QPSK (Quaternary Phase Shift Keying), the number of bits per symbol in transmission is twice the bit number in reception. Similarly, even when the modulation scheme in reception is QPSK and the modulation scheme in transmission is 16 QAM (Quadrature Amplitude Modulation), the number of bits per symbol in transmission is twice the bit number in reception. Further, when the modulation scheme in reception is BPSK and the modulation scheme in transmission is 16 QAM, the number of bits per symbol in transmission is 4 times the bit number in reception and four MAC frames may also be contained in the shared channel. However, although use of a higher level modulation scheme improves a bit rate, resistance to noise, interference, or the like are degraded. Therefore, when the link quality between the relay station and the relay destination node is higher than the link quality between the relay station and the relay source node, the communication control unit 180 of the relay station 100 uses a higher modulation scheme in transmission than the modulation scheme in reception.

Hereinafter, five scenarios for integration of communication resources will be described.

(First Scenario)

Figure 6B:
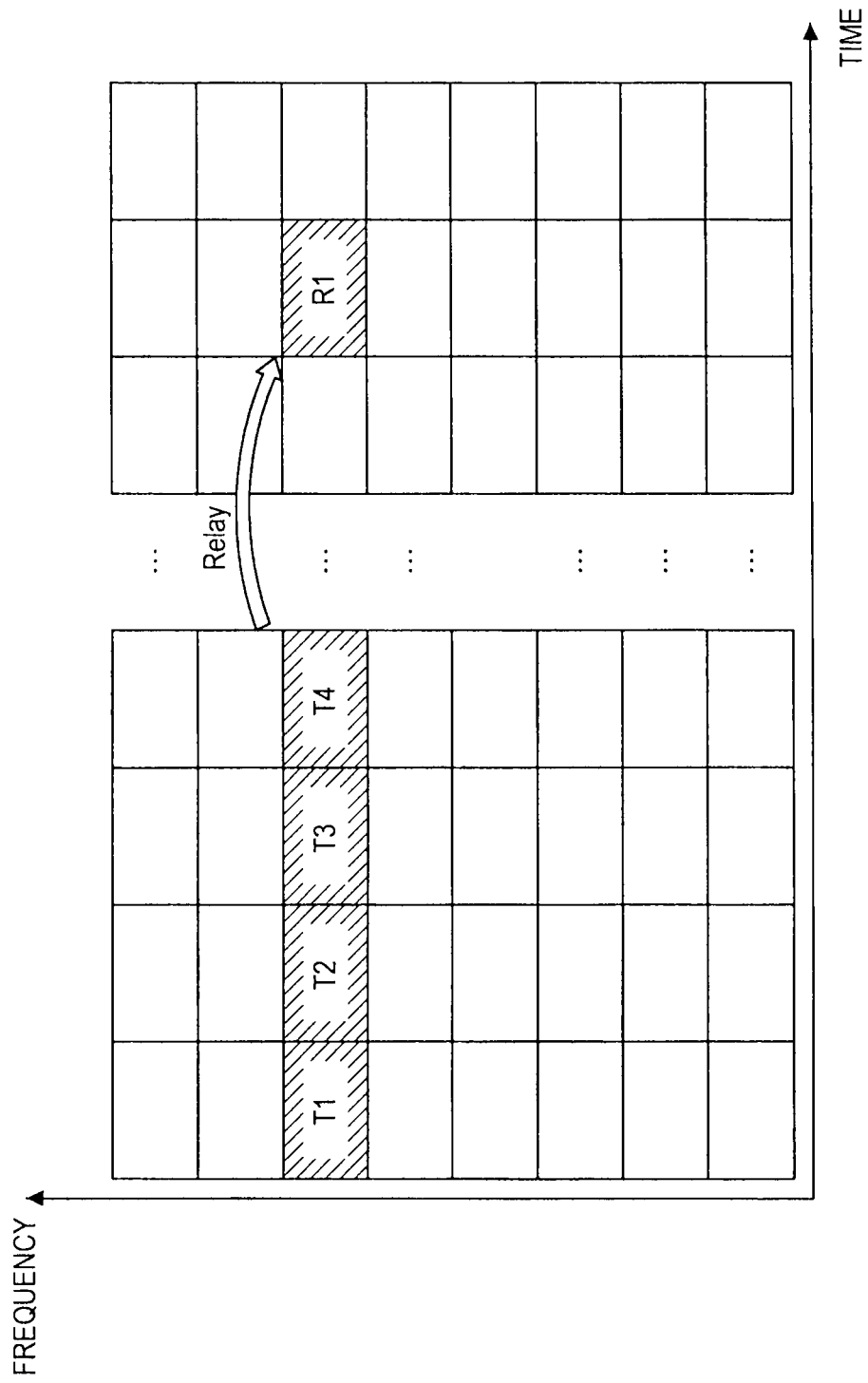
FIG. 6B is an illustrative diagram illustrating resource blocks used in the first scenario for integration of communication resources.

FIG. 6A is an illustrative diagram illustrating a first scenario for integration of communication resources. Further, FIG. 6B is an illustrative diagram illustrating resource blocks used in the first scenario shown in FIG. 6A.

Referring to FIG. 6A, four data D1, D2, D3 and D4 are continuously transmitted from a relay source node TxA to a relay station 100 using separate resource blocks. The data D1, D2, D3 and D4, for example, are transmitted in four different resource blocks T1, T2, T3 and T4, as shown in FIG. 6B. Here, for example, relay destination nodes for data D1, D2, D3 and D4 are common. This case, for example, may occur in transmission of an uplink signal from the mobile station 200b to the base station 10 in the example of FIG. 1. In the example of FIG. 6A, the relay destination node is a relay destination node RxA.

It is assumed that link quality between the relay station 100 and the relay destination node RxA is higher than link quality between the relay source node TxA and the relay station 100, and a modulation scheme capable of accomplishing a bit rate of 4 times per symbol can be used for relaying. In this case, the relay station 100 includes the data D1, D2, D3 and D4 in OFDM symbols of the shared channels H) of one resource block and transmits the data to the relay destination node RxA. For example, as shown in FIG. 6B, the data D1, D2, D3 and D4 are transmitted to the relay destination node RxA in one resource block R1.

Thus, as the communication resources in relay communication are used in an integrated manner according to the link qualities of the communication links, use efficiency of the communication resources is improved. As a result, for example, more users can participate in the wireless communication system 1.

Further, in this case, in order to secure reliability of the relay communication, it is desirable for the relay destination node RxA to verify each relayed data and return a response signal (i.e., ACK (acknowledgment) or NACK (negative acknowledgment)) indicating whether each data is received normally. Here, in the example of FIG. 6A, since the link quality between the relay station 100 and the relay destination node RxA is good, the relay destination node RxA can return the ACK or the NACK for the data D1, D2, D3 and D4 using one resource block.

Figure 6C:
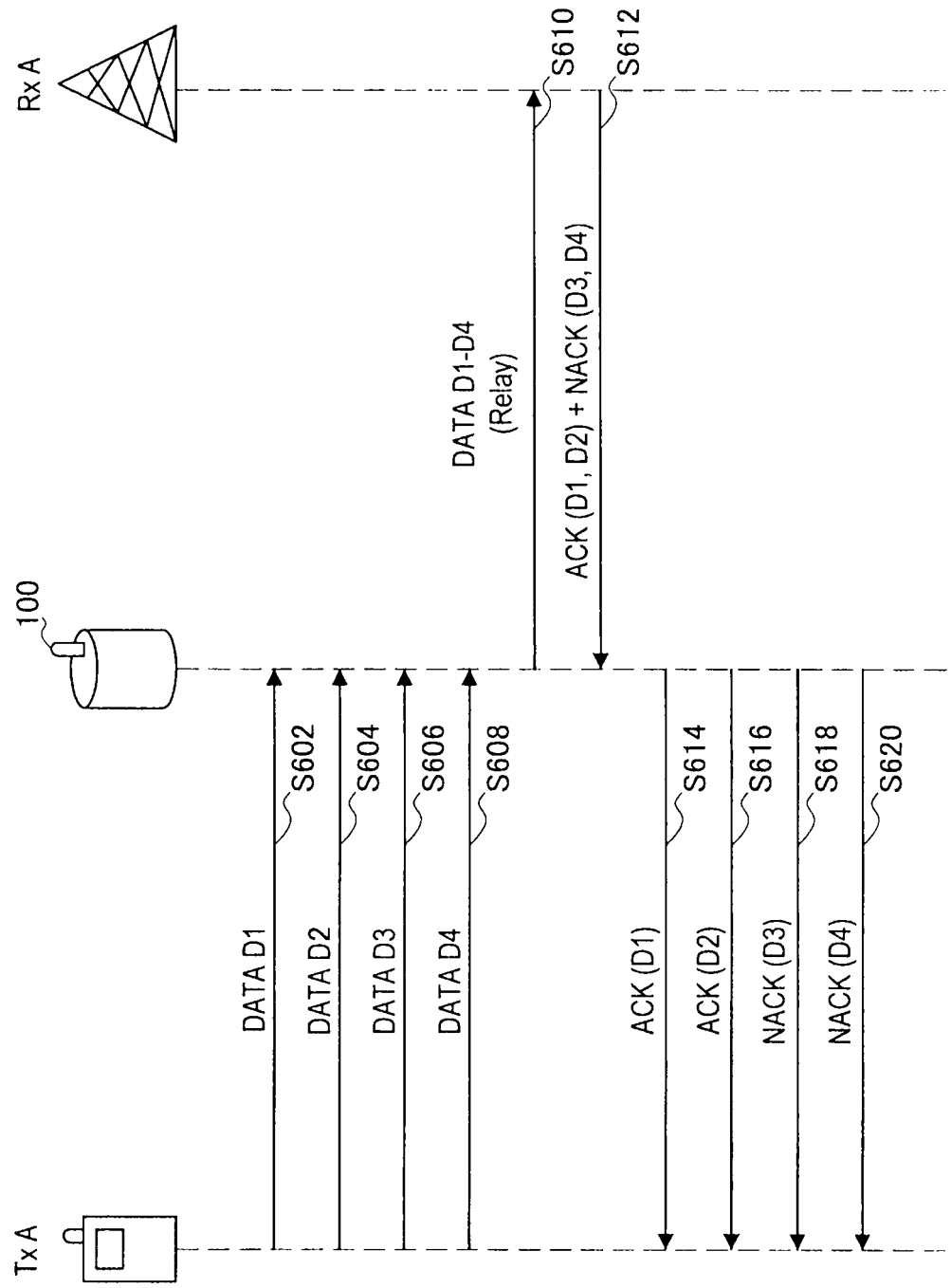
FIG. 6C is an illustrative diagram showing an example of a flow of communication when an ACK and a NACK are returned in the first scenario for integration of communication resources.

FIG. 6C is an illustrative diagram showing an example of a flow of communication when the ACK or the NACK is returned from the relay destination node RxA in the first scenario for integration of communication resources.

Referring to FIG. 6C, first, data D1, D2, D3 and D4 are transmitted in order using separate resource blocks from the relay source node TxA to the relay station 100 (step S602 to S608). The relay station 100 has recognized that relay destinations of the data D1, D2, D3 and D4 are the relay destination node RxA based on, for example, scheduling information that has been acquired in advance. When the relay station 100 receives the data D1, D2, D3 and D4, the relay station 100 modulates each data into OFDM symbols of the shared channels in one resource block using a higher level modulation scheme, and relays the data to the relay destination node RxA using one resource block (step S610). Further, even when the communication resources are integrated, it is desirable to add CRC (Cyclic Redundancy Check) for error detection to each of the original data D1, D2, D3 and D4. In this case, CRC added to each data before integration may be used as it is.

Then, the relay destination node RxA demodulates and decodes the reception signal and verifies whether reception of each data is successful. The ACK is generated for successfully received data and the NACK is generated for data failed to be received. For example, in the example of FIG. 6C, the relay destination node RxA successfully receives the data D1 and D2 and fails to receive the data D3 and D4. In this case, the relay destination node RxA returns two ACKs for the data D1 and D2 and two NACKs for the data D3 and D4 to the relay station 100 using one resource block (step S612).

When the relay station 100 receives the two ACKs or the two NACKs, the relay station 100 returns the ACKs or the NACKs, in order, to the relay source node TxA using separate resource blocks. For example, the ACK for the data D1 is returned in step S614, the ACK for the data D2 is returned in step S616, the NACK for the data D3 is returned in step S618, and the NACK for the data D4 is returned in step S620.

Thus, for the data relayed using the integrated communication resources by the relay station 100, the ACK or the NACK from the relay destination node is returned using the integrated communication resources, thereby further improving use efficiency of the communication resources and shortening a retransmission time.

(Second Scenario)

Figure 7B:
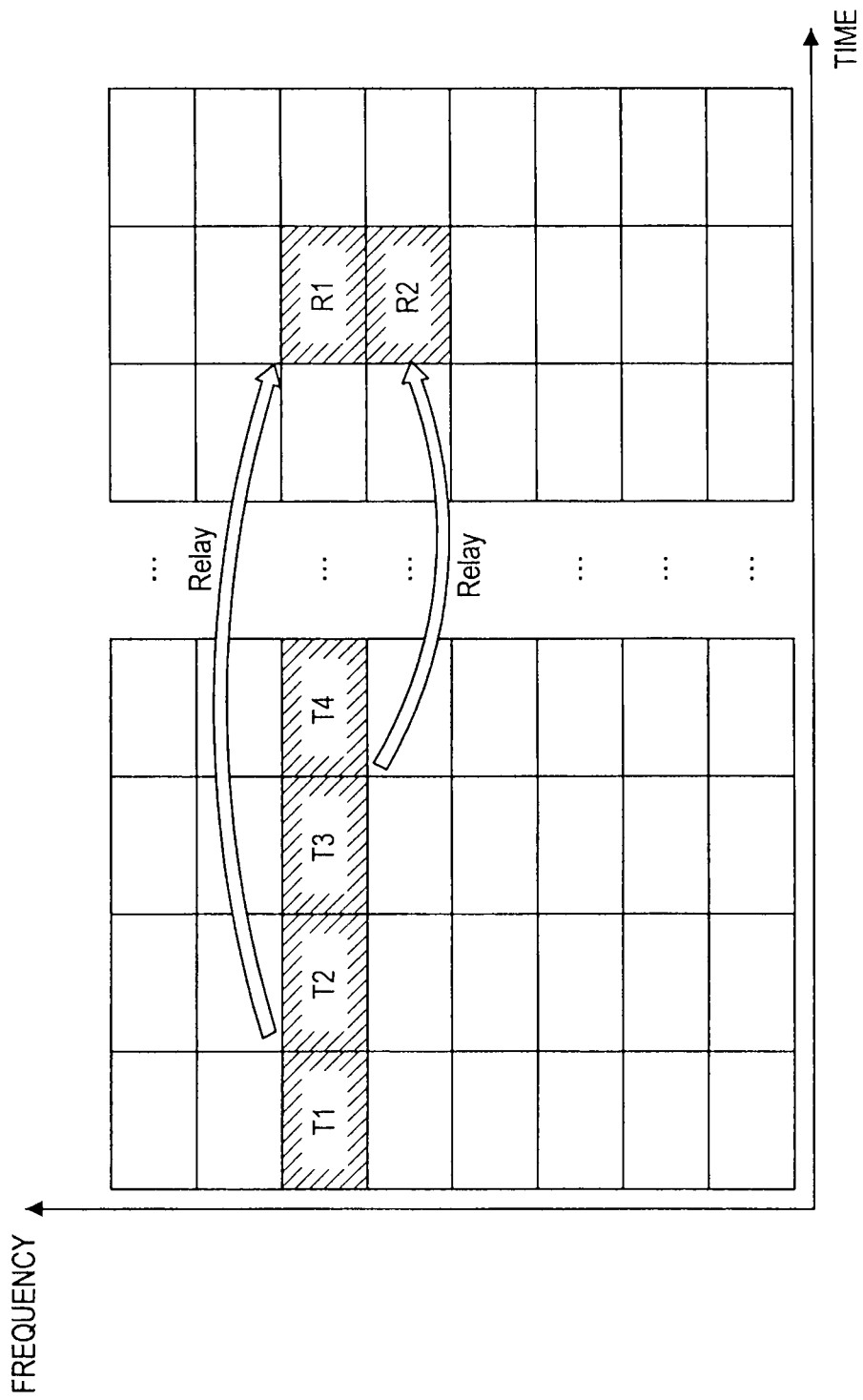
FIG. 7B is an illustrative diagram illustrating resource blocks used in the second scenario for integration of communication resources.

FIG. 7A is an illustrative diagram illustrating a second scenario for integration of communication resources. Further, FIG. 7B is an illustrative diagram illustrating resource blocks used in the second scenario shown in FIG. 7A.

Referring to FIG. 7A, four data D1, D2, D3 and D4 are continuously transmitted from a relay source node TxA to a relay station 100 using separate resource blocks. The data D1, D2, D3 and D4, for example, are transmitted in four different resource blocks T1, T2, T3 and T4, respectively, as shown in FIG. 7B. Here, for example, it is assumed that relay destination nodes for the data D1 and D2 are common. In the example of FIG. 7A, the relay destination nodes for the data D1 and D2 are a relay destination node RxA. Further, it is assumed that relay destination nodes for the data D3 and D4 are also common. In the example of FIG. 7A, the relay destination nodes for the data D3 and D4 is relay destination node RxB.

Further, it is assumed that link quality between the relay station 100 and the relay destination node RxA or RxB is higher than link quality between the relay source node TxA and the relay station 100, and a modulation scheme capable of doubling a bit rate per symbol can be used for relaying. In this case, the relay station 100 includes the data D1 and D2 in OFDM symbols of the shared channels of one resource block and transmits the data to the relay destination node RxA. For example, as shown in FIG. 7B, the data D1 and D2 are transmitted to the relay destination node RxA in one resource block R1. Further, the relay station 100 includes the data D3 and D4 in OFDM symbols of the shared channels of one resource block and transmits the data to the relay destination node RxB. For example, the data D3 and D4 are transmitted to the relay destination node RxB in one resource block R2, as shown in FIG. 7B.

Thus, data contained in radio signals for which relay destination nodes are common are relayed in one block, thereby reducing the number of resource blocks allocated to the relay destination nodes.

(Third Scenario)

FIG. 8A is an illustrative diagram illustrating a third scenario for integration of communication resources. Further, FIG. 8B is an illustrative diagram illustrating resource blocks used in the third scenario shown in FIG. 8A.

Referring to FIG. 8A, data D1 is transmitted from a relay source node TxA to a relay station 100. Further, data D2 is transmitted from a relay source node TxB to the relay station 100. Further, data D3 is transmitted from a relay source node TxC to the relay station 100. Further, data D4 is transmitted from a relay source node TxD to the relay station 100. Referring to FIG. 8B, the four data D1, D2, D3 and D4 are transmitted in four different resource blocks T1, T2, T3 and 14, respectively. Here, for example, it is assumed that relay destination nodes for the data D1, D2, D3 and D4 are common. In the example of FIG. 8A, the relay destination node is a relay destination node RxA.

It is assumed that link quality between the relay station 100 and the relay destination node RxA is higher than link quality between the relay source node TxA, TxB, TxC or TxD and the relay station 100, and a modulation scheme capable of accomplishing a bit rate of 4 times per symbol can be used for relaying. In this case, the relay station 100 includes the data D1, D2, D3 and D4 in OFDM symbols of shared channels of one resource block and transmits the data to the relay destination node RxA. For example, as shown in FIG. 8B, the data D1, D2, D3 and D4 are transmitted to the relay destination node RxA in one resource block R1.

In the case of the third scenario, a plurality of data transmitted in resource blocks having different frequency slots rather than resource blocks having different time slots is relayed by using one resource block in an integrated manner. Even in this case, the communication resources in relay communication are used in an integrated manner according to the link qualities of the communication links, thereby improving use efficiency of the communication resources.

(Fourth Scenario)

Figure 9B:
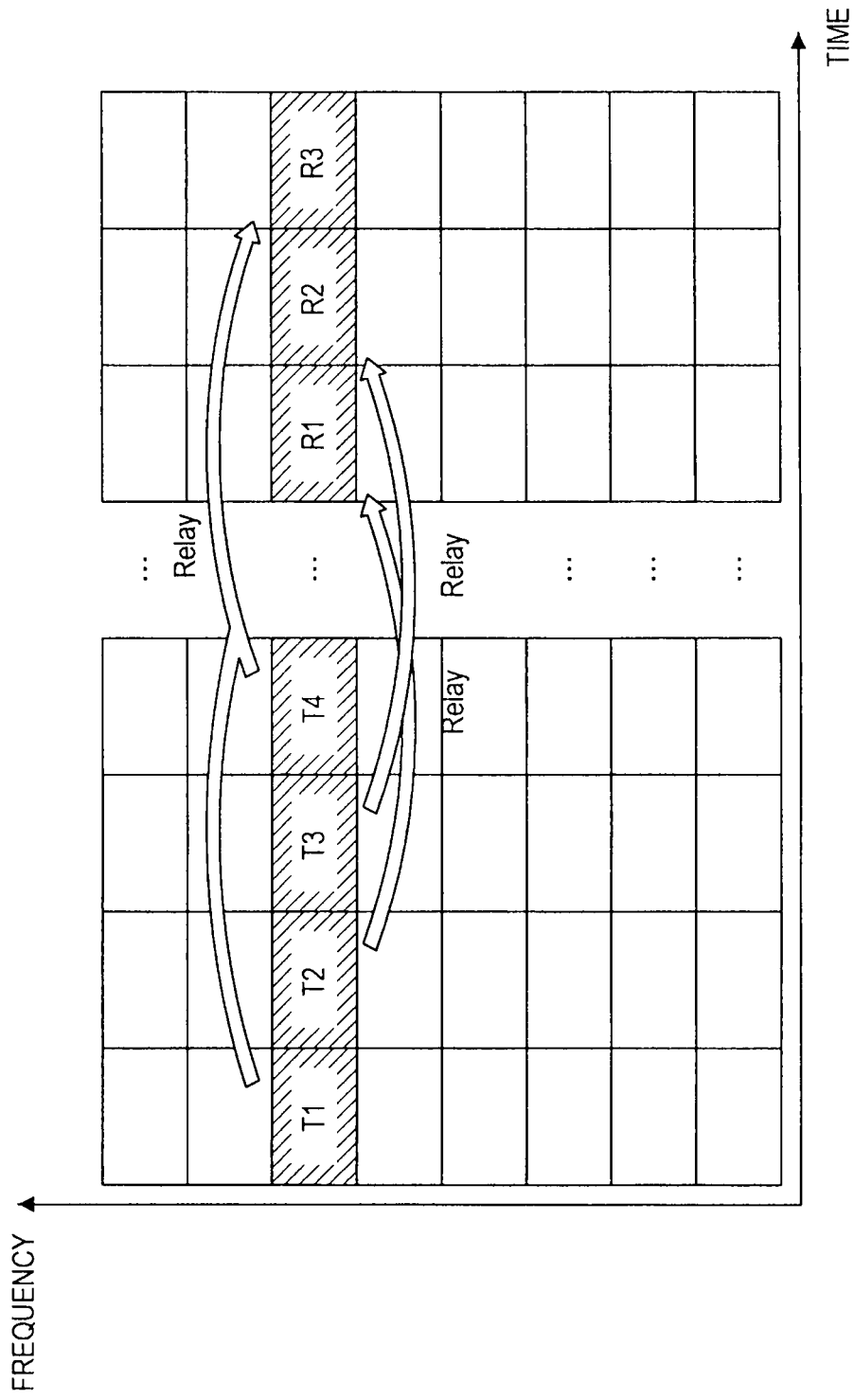
FIG. 9B is an illustrative diagram illustrating resource blocks used in the fourth scenario for integration of communication resources.

FIG. 9A is an illustrative diagram illustrating a fourth scenario for integration of communication resources. Further, FIG. 9B is an illustrative diagram illustrating resource blocks used in the fourth scenario shown in FIG. 9A.

Referring to FIG. 9A, data D1, D2, D3 and D4 are transmitted from a relay source node TxA to a relay station 100. The data D1, D2, D3 and D4, for example, are transmitted in four different resource blocks T1, T2, T3 and T4, respectively, as shown in FIG. 9B. Here, for example, it is assumed that relay destination nodes for data D1, D2, D3 and D4 are common. In the example of FIG. 9A, the relay destination node is a relay destination node RxA.

It is assumed that link quality between the relay station 100 and the relay destination node R×A is higher than link quality between the relay source node T×A and the relay station 100, and a modulation scheme capable of doubling a bit rate per symbol can be used for relaying. It is also assumed that the data D1 and D4 among the data D1 to D4 are data used for a non-real-time application, and the data D2 and D3 are data used for a real-time application. Here, delay caused by data integration is not likely to be allowed in the real-time application. The relay station 100 integrates only D1 and D4 used for the non-real-time application in one resource block and transmits D1 and D4 to the relay destination node R×A. For example, as shown in FIG. 9B, the data D2 is transmitted to the relay destination node R×A in a resource block R1. Next, the data D3 is transmitted to the relay destination node R×A in a resource block R2. Then, the data D1 and D4 are transmitted to the relay destination node R×A in one resource block R3.

FIG. 9C shows an example of information that may be used to identify a type of an application related to relayed data, and is a table showing a list of QCI (QoS Class Identifier) information defined in the rm. Referring to FIG. 9C, the QCI information includes four items: a resource type, a priority, a packet delay budget, and a packet loss rate. Further, an application example corresponding to each QCI is described in the table of FIG. 9C. Among them, for example, QCI3 is QCI applied to, for example, a real-time game, in which the packet delay budget is 50 msec, which is smallest. Accordingly, it is recognized that real time required for the application is strictest for data indicating QCI3. Further, for example, QCI1 (telephone call), QCI5 (IP multimedia system signaling), and QCI7 (bidirectional game) also have a packet delay budget of 100 msec, which is smaller than those of other QCIs. Accordingly, it is recognized that real time required for the applications is also strict for data indicating QCI1, QCI5 and QCI7.

The communication control unit 180 of the relay station 100 may determine real time required for each data based on QCI information as acquired via the control channel. It is desirable for the communication control unit 180 to cause the wireless transmission unit 118 to relay each data related to an application requiring the real time using as many resource blocks as in reception. By doing so, it is possible to improve use efficiency of the communication resources by dynamically changing the communication resources for only data related to other applications without damage of the real time of the application due to the relay communication.

(Fifth Scenario)

Figure 10A:
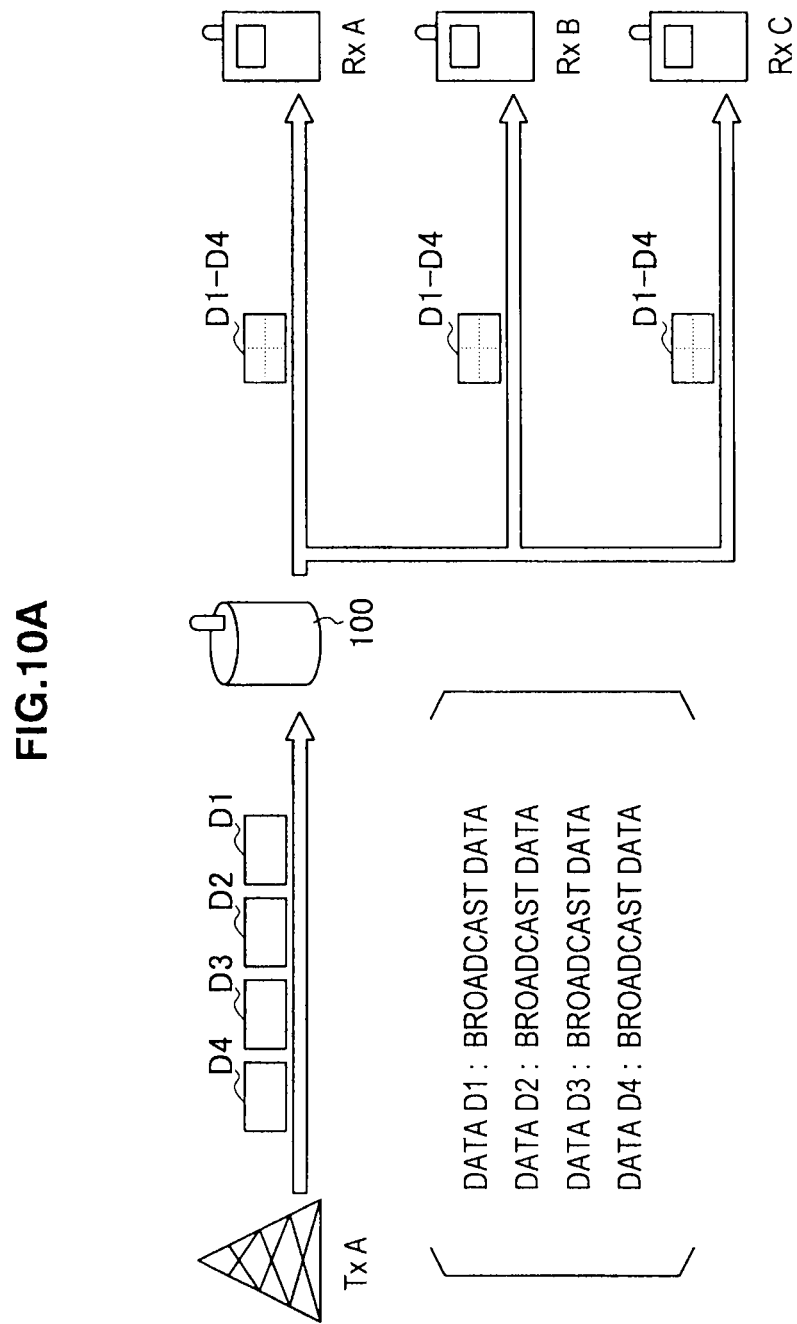
FIG. 10A is an illustrative diagram illustrating a fifth scenario for integration of communication resources.

FIG. 10A is an illustrative diagram illustrating a fifth scenario for integration of communication resources. Further, FIG. 10B is an illustrative diagram illustrating resource blocks used in the fifth scenario shown in FIG. 10A.

Referring to FIG. 10A, four data D1, D2, D3 and D4 are transmitted from a relay source node T×A to a relay station 100 using separate resource blocks. The data D1, D2, D3 and D4, for example, are transmitted in four different resource blocks T1, T2, T3 and T4, respectively, as shown in FIG. 10B. Here, for example, the data D1, D2, D3 and D4 are assumed to be broadcast data. In this case, in the example of FIG. 10A, relay destination nodes are relay destination nodes R×A, R×B and R×C.

It is assumed that link quality between a relay station 100 and the relay destination node R×A, R×B or R×C is higher than link quality between a relay source node T×A and the relay station 100, and a modulation scheme capable of accomplishing a bit rate of 4 times per symbol can be used for relaying. In this case, the relay station 100 includes the data D1, D2, D3 and D4 in OFDM symbols of shared channels of one resource block and transmits the data to the relay destination nodes R×A, R×B and R×C. For example, as shown in FIG. 10B, the data D1 to D4 are transmitted to the relay destination node R×A in one resource block R1, to the relay destination node R×B in one resource block R2, and to the relay destination node R×C in one resource block R3.

Thus, the relay station 100 may use the communication resources in an integrated manner according to the link qualities of the communication links and perform relaying, for broadcast data or multicast data, as well as unicast data.

[2-3. Division of Communication Resources]

FIG. 11 shows an example of a divided frame structure when a data frame received in one resource block is divided into a plurality of resource blocks. Referring to FIG. 11, one subframe corresponding to one resource block includes three OFDM symbols for control channels, and 11 OFDM symbols for shared channels, similar to the example of FIG. 2. Here, a description of a frequency domain is omitted. In the example of FIG. 11, one MAC frame including a MAC header and a MAC payload is mapped to 22 (=11×2) shared channels of two subframes. Such a frame structure may be used when a modulation scheme in which the number of bits per symbol is ½ the bit number in reception is selected in transmission. For example, when a modulation scheme in reception is QPSK and a modulation scheme in transmission is BPSK, the number of bits per symbol in transmission is ½ the bit number in reception. Similarly, even when the modulation scheme in reception is 16 QAM and the modulation scheme in transmission is QPSK, the number of bits per symbol in transmission is ½ the bit number in reception. Further, when the modulation scheme in reception is 16 QAM and the modulation scheme in transmission is BPSK, the number of bits per symbol in transmission is ¼ the bit number in reception and one MAC frame can be included in shared channels of four subframes. Such a frame structure may be selected by the communication control unit 180 of the relay station 100, for example, when the link quality between the relay station and the relay destination node is lower than the link quality between the relay station and the relay source node.

Further, in the example of FIG. 11, the number of symbols occupied by the MAC frame simply increases twice regardless of content of the MAC frame. The first half is mapped to the first subframe and the second half is mapped to the second subframe. In this case, a bit padding process is less likely to be required due to generation of extra bits in each divided subframe.

Figure 12:
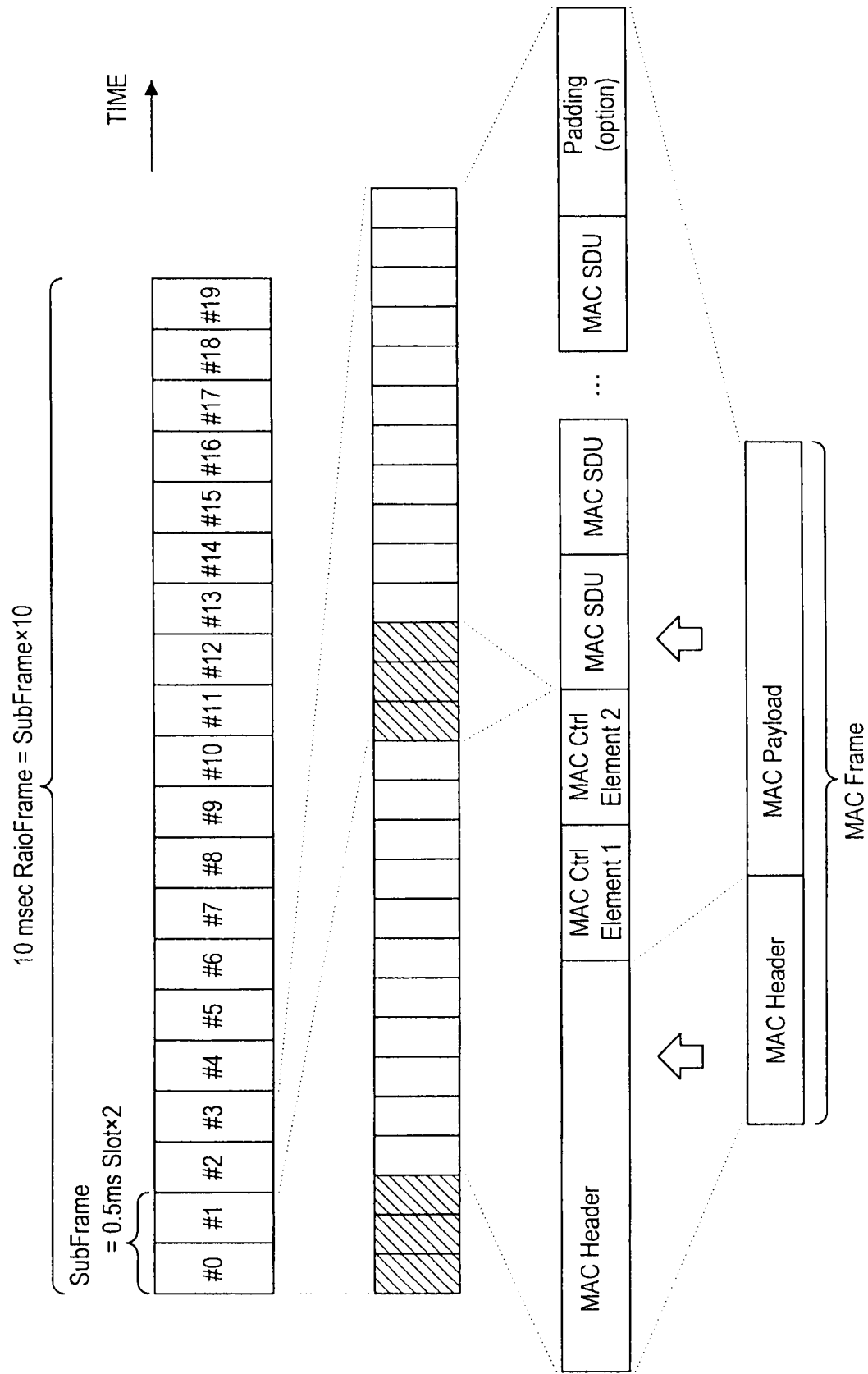
FIG. 12 is an illustrative diagram showing another example of a frame structure when a data frame received in one resource block is divided into a plurality of resource blocks.

FIG. 12 shows another example of a divided frame structure when a data frame received in one resource block is divided into a plurality of resource blocks. Referring to FIG. 12, one subframe corresponding to one resource block includes three OFDM symbols for control channels, and 11 OFDM symbols for shared channels, similar to the example of FIG. 11. Further, a description of a frequency domain is omitted herein. In the example of FIG. 12, a MAC header and two MAC control elements in a MAC payload are mapped to the shared channels of the first subframe among two subframes. Further, a plurality of MAC SDUs is mapped to the shared channels of the second subframe. In this case, although mapping is performed according to a logical structure of a MAC frame, extra bits are generated in each divided subframe and a bit padding process is highly likely to be required. This frame structure may also be used when a modulation scheme in which the number of bits per symbol is, for example, ½ or ¼ the bit number in reception is selected in transmission.

Further, in the integration of the communication resources described with reference to FIG. 5 or the division of communication resources described with reference to FIG. 11 or 12, information indicating which blocks are associated with each other may be described in the control channels of each subframe. For example, when the communication resources are divided and one MAC frame consists of two subframes, information indicating that one MAC frame is to be recovered from the first and second subframes may be described in the control channels of each subframe.

Hereinafter, two scenarios for division of communication resources will be described.

(First Scenario)

Figure 13A:
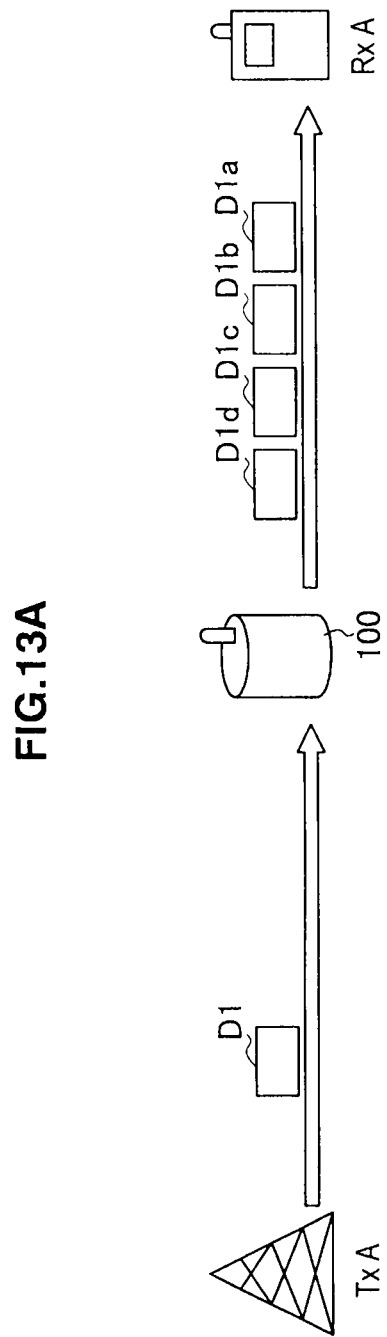
FIG. 13A is an illustrative diagram illustrating a first scenario for division of communication resources.

FIG. 13A is an illustrative diagram illustrating a first scenario for division of communication resources. Further, FIG. 13B is an illustrative diagram illustrating resource blocks used in the first scenario shown in FIG. 13A.

Referring to FIG. 13A, data D1 is transmitted from a relay source node TxA to a relay station 100 using one resource block. The data D1, for example, is transmitted in a resource block T1, as shown in FIG. 13B. A relay destination node for the data D1 is a relay destination node RxA.

Here, it is assumed that link quality between the relay station 100 and the relay destination node RxA is lower than link quality between the relay source node TxA and the relay station 100, and a bit rate of only ¼ times per symbol can be used to reliably deliver the data to the relay destination node RxA. In this case, the relay station 100 divides the data D1 into four partial data D1a, D1b, D1c and D1d, and transmits the partial data to the relay destination node RxA using separate resource blocks. For example, as shown in FIG. 13B, the partial data D1a, D1b, D1c and D1d are transmitted to the relay destination node RxA in the separate resource blocks R1, R2, R3 and R4.

Thus, as the relay station divides the communication resources according to the link qualities of the communication links and performs relay communication, the relay source node having a good link quality with the relay station can transmit the data in one block. As a result, use efficiency of the communication resources of the overall system is improved.

(Second Scenario)

Figure 14A:
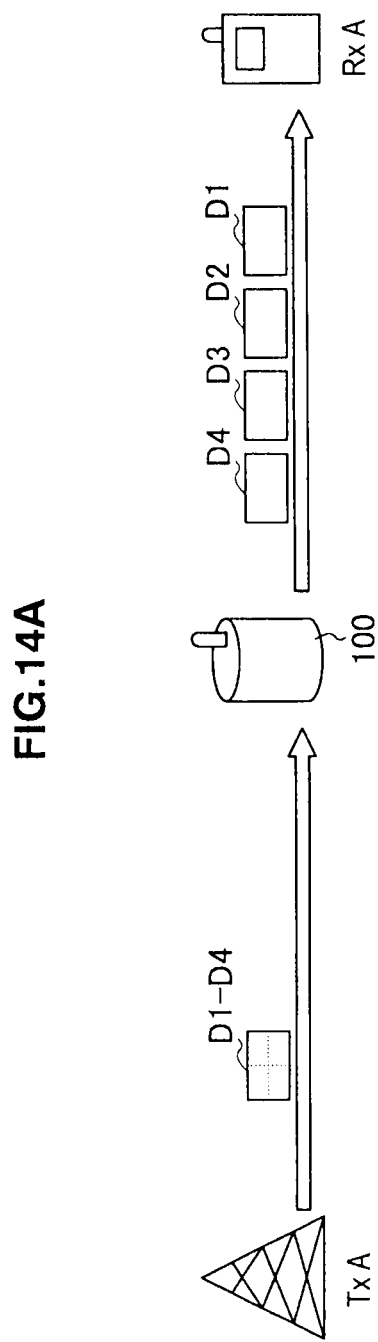
FIG. 14A is an illustrative diagram illustrating a second scenario for division of communication resources.
Figure 14B:
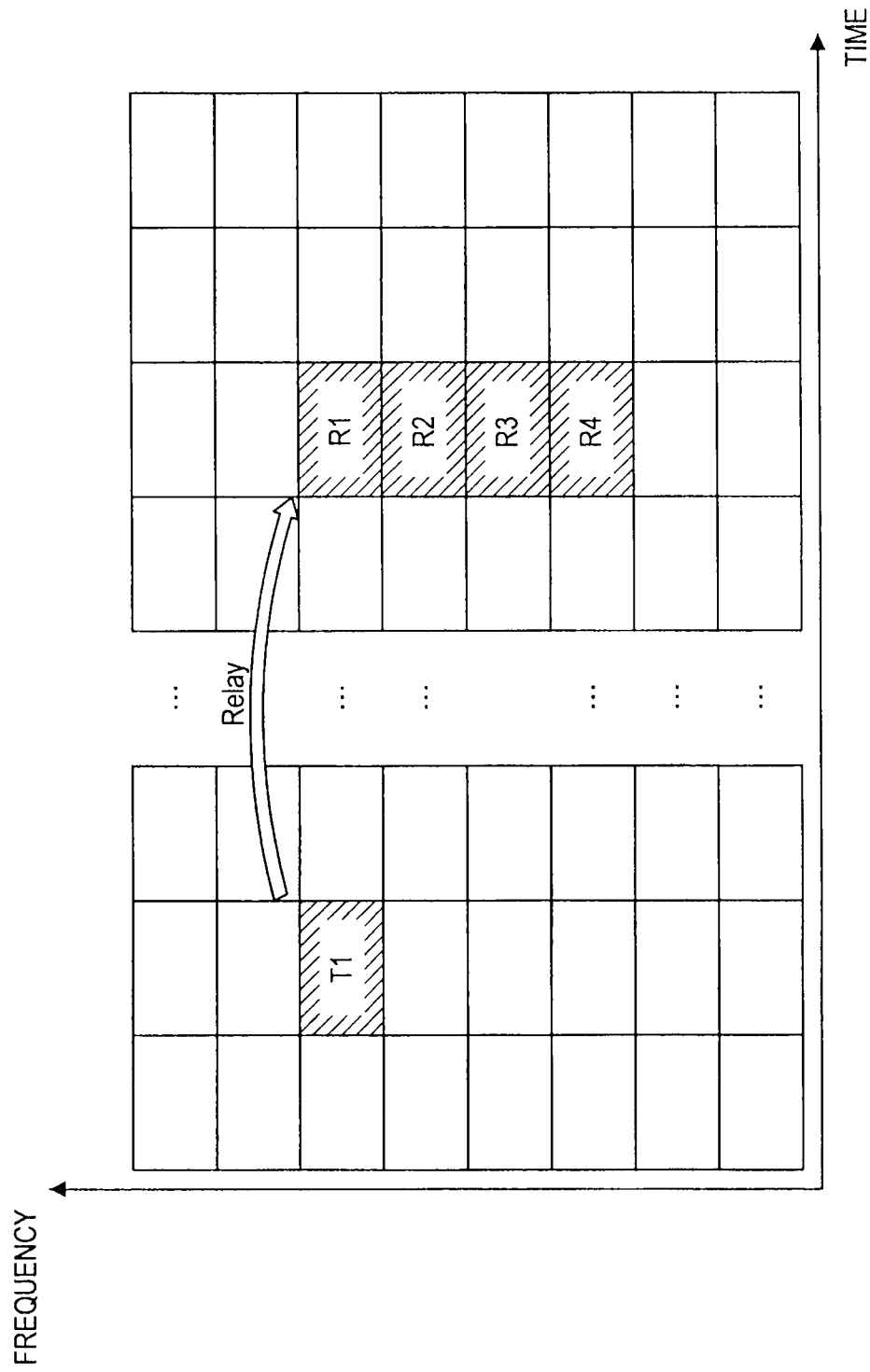
FIG. 14B is an illustrative diagram illustrating resource blocks used in the second scenario for division of communication resources.

FIG. 14A is an illustrative diagram illustrating a second scenario for division of communication resources. Further, FIG. 14B is an illustrative diagram illustrating resource blocks used in the second scenario shown in FIG. 14A.

Referring to FIG. 14A, data D1 to D4 are transmitted from a relay source node TxA to a relay station 100 using one resource block. The data D1 to D4, for example, are transmitted in the resource block T1, as shown in FIG. 14B. In this case, four data frames having data D1 to D4, respectively, are included in shared channels of the resource block T1. A relay destination node for the data D1 to D4 is a relay destination node RxA.

Here, it is assumed that link quality between the relay station 100 and the relay destination node RxA is lower than link quality between the relay source node TxA and the relay station 100, and a bit rate of only ¼ times per symbol can be used to reliably deliver the data to the relay destination node RxA. In this case, the relay station 100 separates the data D1 to D4 and transmits the data to the relay destination node RxA using separate resource blocks. For example, as shown in FIG. 14B, the data D1, D2, D3 and D4 are transmitted to the relay destination node RxA in the separate resource blocks R1, R2, R3 and R4, respectively.

Even in this case, as the relay station divides the communication resources according to the link qualities of the communication links and performs relay communication, the relay source node having a good link quality with the relay station can transmit a plurality of data in one block. As a result, use efficiency of the communication resources of the overall system is improved.

[2-4. Arrangement Change of Communication Resources]

Figure 15:
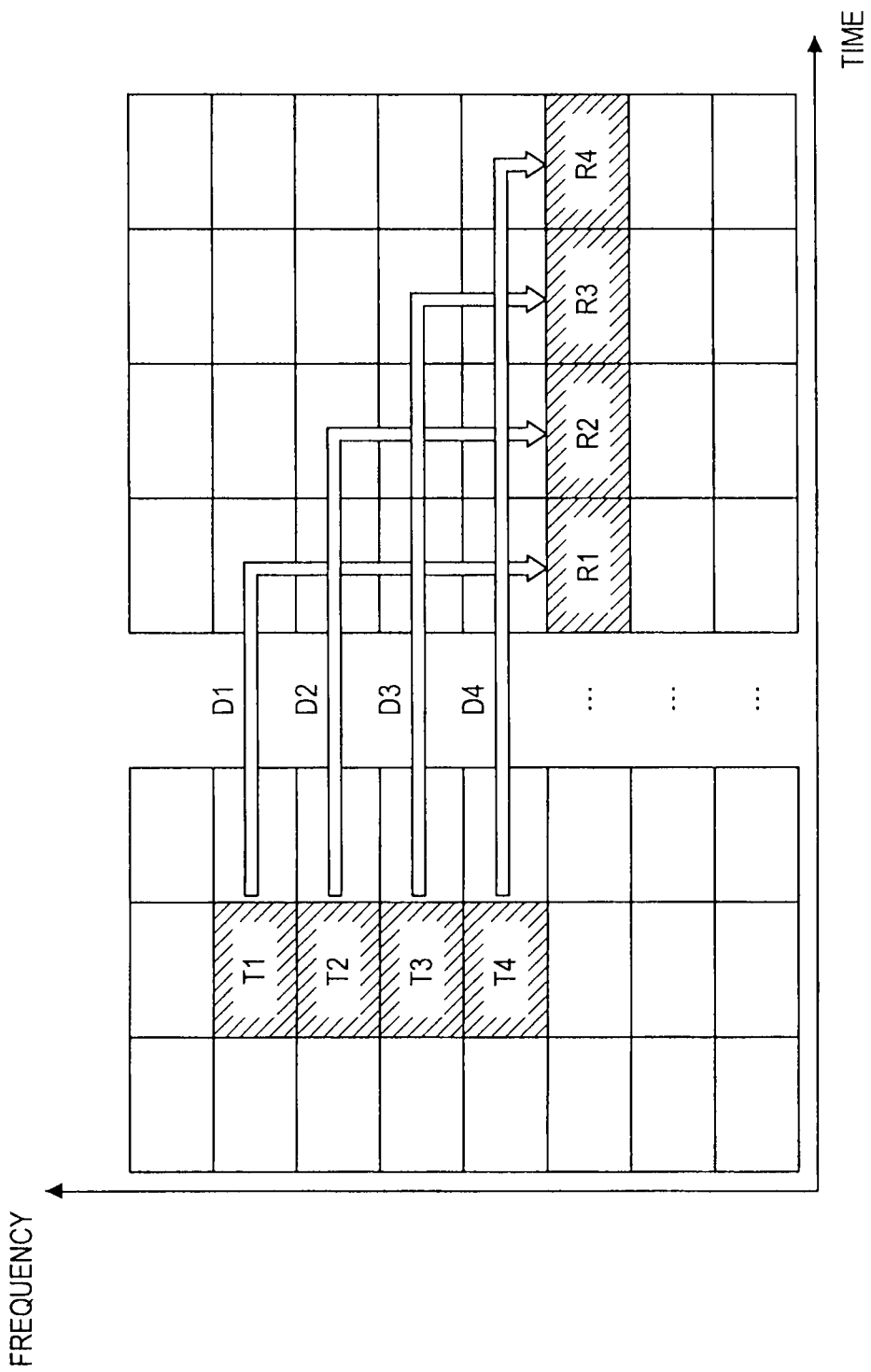
FIG. 15 is an illustrative diagram illustrating resource blocks used in a scenario for arrangement change of communication resources.

FIG. 15 is an illustrative diagram illustrating resource blocks used in a scenario for arrangement change of communication resources.

Referring to FIG. 15, data D1 is transmitted from a relay source node to the relay station 100 using a resource block T1. The relay station 100 transmits the data D1 to the relay destination node using a resource block R1. Further, data D2 is transmitted from the relay source node to the relay station 100 using a resource block T2. The relay station 100 transmits the data D2 to the relay destination node using a resource block R2. Further, data D3 is transmitted from the relay source node to the relay station 100 using a resource block T3. The relay station 100 transmits the data D3 to the relay destination node using a resource block R3. Further, data D4 is transmitted from the relay source node to the relay station 100 using a resource block T4. The relay station 100 transmits the data D4 to the relay destination node using a resource block R4.

Here, the source blocks T1 to T4 used for the relay station 100 to receive the data D1 to D4 are different blocks in the frequency domain. Meanwhile, the resource blocks R1 to R4 used for the relay station 100 to transmit the data D1 to D4 are in the same position in the frequency domain, but in different positions in the time domain. Thus, the relay station 100 changes the arrangement of the communication resources and then relays the data, such that the relay communication can be performed without use of a predetermined frequency slot, for example, when the predetermined frequency slot is occupied for a specific purpose or function of the relay destination node.

3. EXAMPLE OF SCHEDULING PROCESS

Generally, in a wireless communication system using a cellular scheme, allocation of the communication resources is performed by a base station that manages a cell (or network controller connected with a plurality of base stations, for example) based on a request for data communication authorization from the mobile station. A set of processes, including the request for data communication authorization from the mobile station, the allocation of the communication resources by the base station, and the notification of the allocation of the communication resources from the base station to the mobile station, are referred to as a scheduling process in the present disclosure. Here, when there is a relay station between the mobile station and the base station, the relay station receives scheduling information (information notifying of allocation of the communication resources) distributed from the base station, and determines which blocks to use for relay communication by referring to the scheduling information. Blocks (e.g., the above-described resource blocks) used when the relay station relays data may be selected from a plurality of fixed blocks allocated in advance. Further, the relay station may transmit a request for allocation of the communication resources used for data relay to the base station by itself and dynamically receive allocation of the communication resources.

Figure 16:
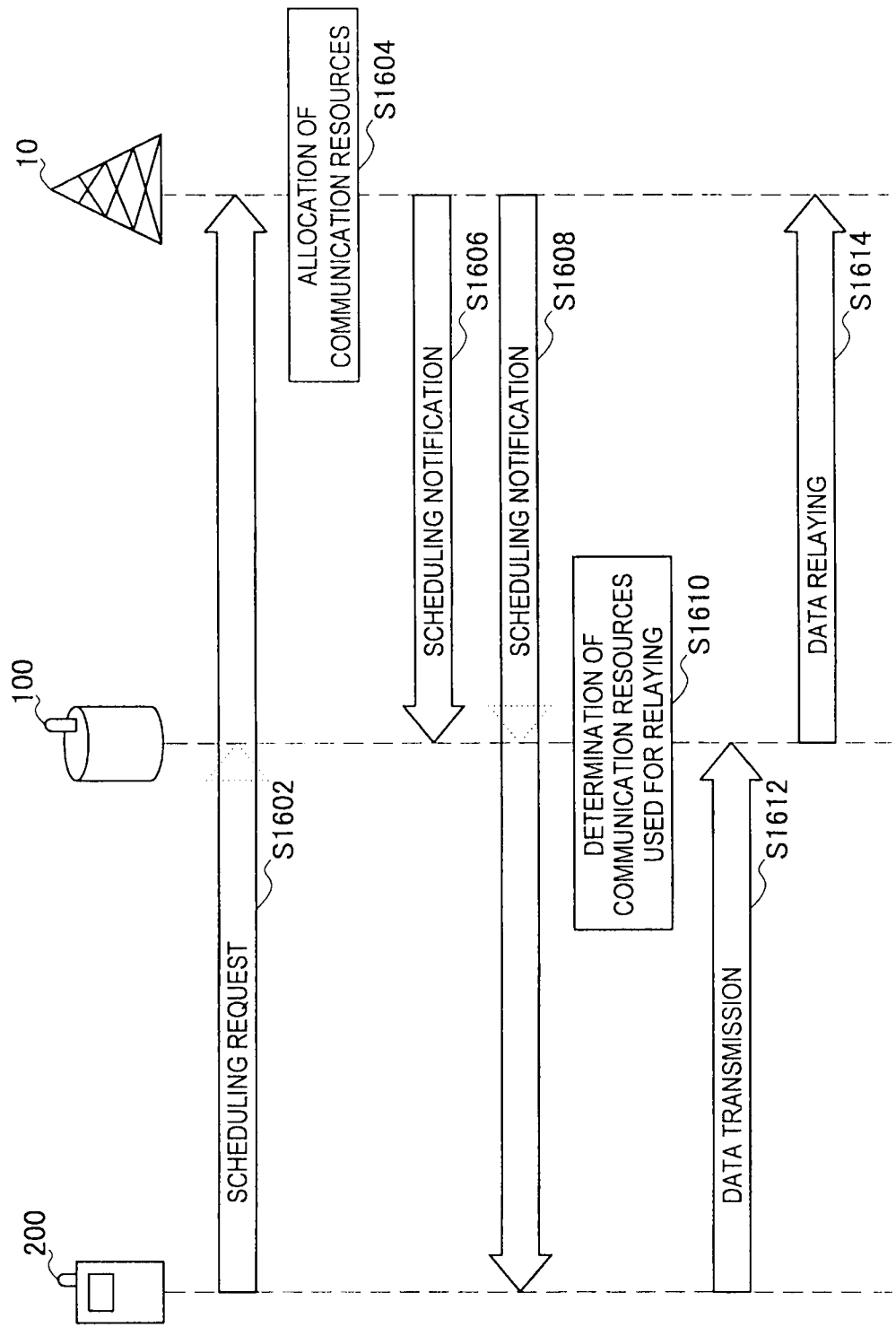
FIG. 16 is an illustrative diagram showing an example of a flow of a scheduling process in a wireless communication system according to an embodiment.

FIG. 16 is an illustrative diagram showing an example of a flow of the scheduling process in the wireless communication system 1. Referring to FIG. 16, first, a scheduling request, i.e., a request for data communication authorization, is transmitted from the mobile station 200 to the base station 10 (step S1602). Such a request, for example, is relayed to the base station 10 by the relay station 100. Then, the base station 10 allocates any blocks individually divided in at least one of a time domain, a frequency domain, a code domain, and a space domain, to data communication of the mobile station 200 (step S1604). Next, the base station 10 transmits scheduling information for notifying of the result of the allocation of the communication resources to the relay station 100 and the mobile station 200 in a cell. The relay station 100 may recognize which mobile station 200 tries to transmit data in which block by receiving such scheduling information (step S1606), and the scheduling information is relayed by the relay station 100 and then received by the mobile station 200 (step S1608). The relay station 100, for example, determines blocks to be used for relay of data from the mobile station 200 according to link qualities of a communication link between the relay station and the mobile station 200 and a communication link between the relay station and the base station by referring, to the received scheduling information (step S1610). Then, the mobile station 200 transmits the data to the relay station 100 in the block allocated by the base station 10 (step S1612). The relay station 100 then relays the data received from the mobile station 200 to the base station 10 in the block determined in step S1610 (step S1614).

In the scheduling process illustrated in FIG. 16, at a time when the base station 10 performs allocation of the communication resources (step S1604), communication resources to be integrated or divided by the relay station 100 in the relay communication are not determined. That is, the relay station 100 determines the communication resources used for relaying in step S1610 after receiving the scheduling information notifying of the result of the allocation of the communication resources. In this case, when the resources allocated by the base station 10 are more than resources necessary for relaying, the relay station 100 may request the base station 10 to allocate surplus resources for another communication again in order to effectively utilize the surplus resources. Further, when the resources allocated by the base station 10 are less than the resources necessary for relaying, the relay station 100 may buffer some data to be relayed, for example, using the storage unit 140, and may relay the data after next resource allocation.

Figure 17:
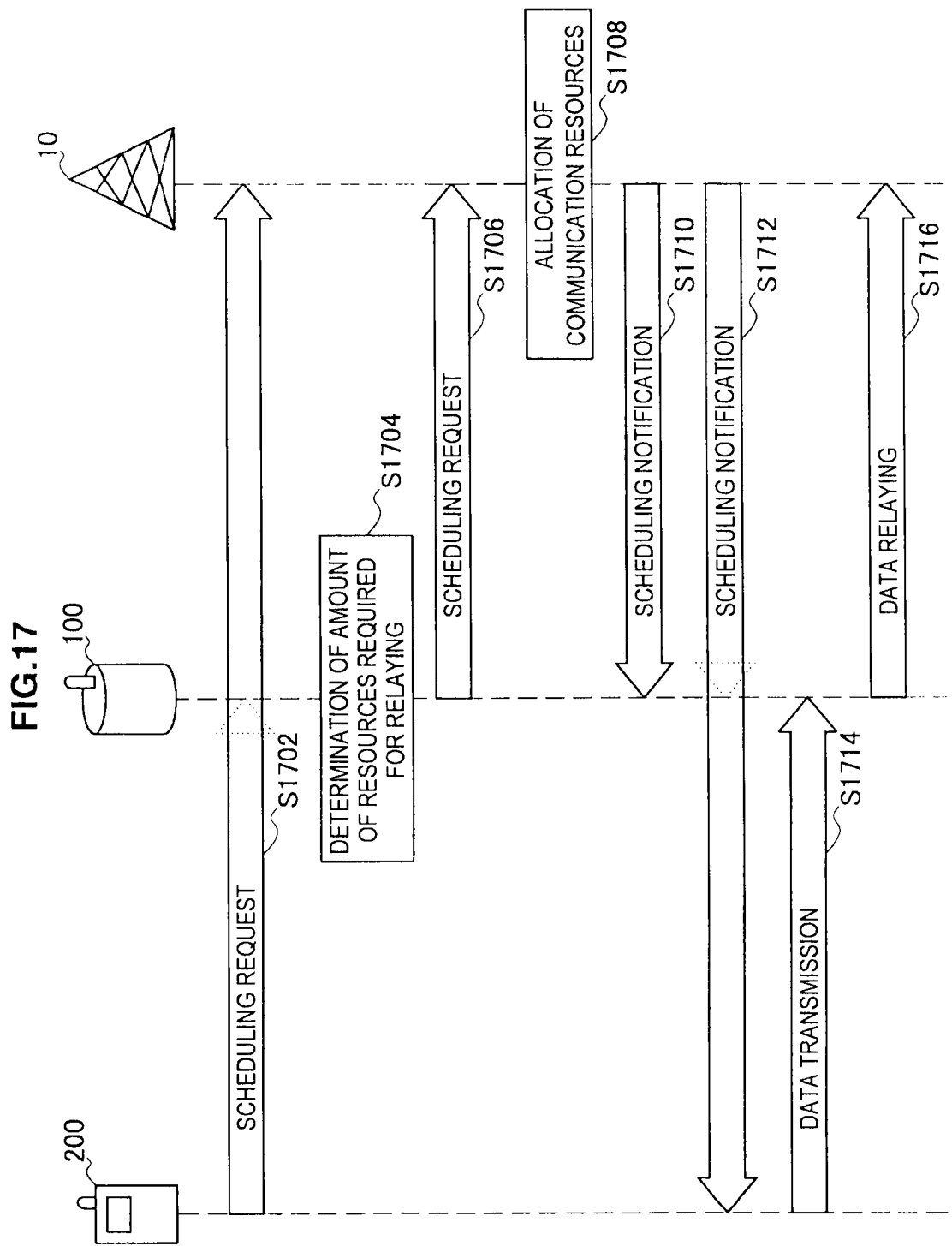
FIG. 17 is an illustrative diagram showing another example of the flow of the scheduling process in the wireless communication system according to an embodiment.

FIG. 17 is an illustrative diagram showing another example of the flow of the scheduling process in the wireless communication system 1. Referring to FIG. 17, first, a scheduling request is transmitted from the mobile station 200 to the base station 10 (step S1702). Such a request, for example, is relayed to the base station 10 by the relay station 100. Further, the relay station 100 recognizes that the mobile station 200 tries to transmit data, by receiving the scheduling request in step S1702. Then, the relay station 100, for example, determines an amount of communication resources (e.g., the number of resource blocks) necessary for relay of the data from the mobile station 200 according to link qualities of a communication link between the relay station and the mobile station 200 and a communication link between the relay station and the base station (step S1704). The relay station 100 requests the base station 10 to allocate the communication resources for relay of the data from the mobile station 200 (step S1706). Then, the base station 10 allocates blocks individually divided in at least one of a time domain, a frequency domain, a code domain, and a space domain to the data communication of the mobile station 200 and the relay communication of the relay station 100 (step S1708). Next, the base station 10 transmits scheduling information for notifying of the result of the allocation of the communication resources to the relay station 100 and the mobile station 200 in a cell. The relay station 100 receives (and relays) such scheduling information (step S1710). Further, the mobile station 200 receives the scheduling information relayed by the relay station 100 (step S1712). The mobile station 200 then transmits the data to the relay station 100 in the block allocated by the base station 10 (step S1714). Then, the relay station 100 relays the data received from the mobile station 200 to the base station 10 in the block allocated by the base station 10 (step S1716).

In the scheduling process illustrated in FIG. 17, at a time when the base station 10 performs the allocation of the communication resources (step S1708), communication resources to be integrated or divided by the relay station 100 in the relay communication are determined. Thereby, a surplus or shortage of resources is less likely to occur after the base station 10 allocates the communication resources. Further, when quality of the communication link is changed over time, the relay station 100 may change arrangement of resources used for relay communication after receiving the scheduling information. Thereby, use efficiency of relay communication resources can further increase.

Further, the example in which the relay station 100 determines how to integrate or divide communication resources in the relay communication has been described herein. However, the present invention is not limited to such an example and the base station 10 (or the above-described network controller, for example) may determine how to integrate or divide communication resources. For example, the base station 10 may collect information on link quality between the base station 10 and the relay station 100 and the link quality between the relay station 100 and the mobile station 200 prior to the scheduling process. By doing so, the base station 10 can determine how to integrate or divide the communication resources for the relay communication of the relay station 100 in the communication resource allocation step. In this case, the relay station 100 performs relay communication according to the scheduling information distributed from the base station 10, thereby improving use efficiency of the communication resources of the overall system.

Figure 18:
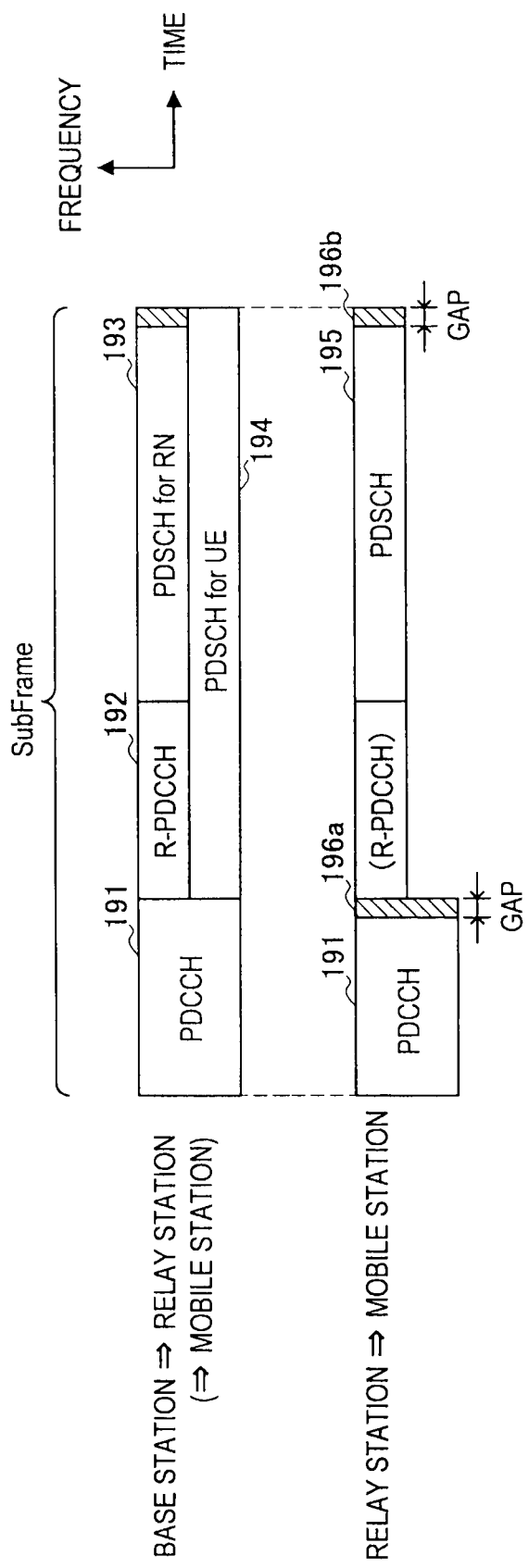
FIG. 18 an illustrative diagram showing an example of a frame format that may be used in an embodiment.

FIG. 18 shows an example of a frame format of a downlink that may be used in the present embodiment, that is, a frame format for relay communication defined in a specification of 3GPP TSG RAN WG1. Further, the frame format of FIG. 18 may be applied to a case in which communication resources are divided in the time domain and the frequency domain, for example, as in an OFDMA scheme.

Referring to FIG. 18, one subframe of a downlink transmitted from the base station 10 contains, in a head part, a PDCCH (Physical Downlink Control CHannel) 191, which is a control channel mainly for a mobile station. The PDCCH 191 is used, for example, for the base station 10 to transmit the scheduling information to the mobile station 200. The scheduling information in the PDCCH 191 is relayed to the mobile station 200 by the relay station 100 and received by the mobile station 200 (e.g., step S1608 in FIG. 16 or step S1712 in FIG. 17).

A part subsequent to the PDCCH 191 is divided into an R-PDCCH (Relay-PDCCH) 192 and a PDSCH (Physical Downlink Shared CHannel) 193 for a relay station and a PDSCH 194 for a mobile station according to a frequency or a subcarrier. The R-PDCCH 192 is a relay control channel including control information for a relay station. The transmission of the scheduling information from the base station 10 to the relay station 100 in step S1606 of FIG. 16 or step S1710 of FIG. 17, for example, may be performed on the R-PDCCH 192. Further, the PDSCH 193 subsequent to the R-PDCCH 192 may be used for the base station 10 to transmit, to the relay station 100, data to be relayed to the mobile station 200 by the relay station 100. In the PDSCH 193, the data received from the base station 10 by the relay station 100 is relayed to the mobile station 200 in the PDSCH 195. The R-PDCCH 1192 and the PDSCH 193, for example, may be realized on a backhaul link.

The PDSCH 194 may be used as a shared channel when the mobile station 200 directly receives data from the base station 10 without relaying of the relay station 100.

In a subframe of a downlink from the relay station 10 to the mobile station 200, gap periods 196a and 196b are provided after a PDCCH 191 and a PDSCH 195, respectively. The gap periods 196a and 196b are used to switch hardware between a configuration for reception of common control channels and a configuration for a relay operation in the relay station 100.

Thus, the scheduling information for the relay station and the scheduling information for the mobile station may be transmitted in different periods in the same frame from the base station. Alternatively, the scheduling information may be transmitted in different frames, respectively. Using the frame format as shown in FIG. 18, for example, general cellular communication and the relay communication described in this disclosure may be suitably coexist.

4. EXEMPLARY CONFIGURATION OF MOBILE STATION AND BASE STATION

The wireless communication system 1 according to the present embodiment has been described above, particularly, with respect to the configuration of the relay station 100 in detail with reference to FIGS. 1 to 18. Meanwhile, the base station 10 and the mobile station 200 may have the same configuration as the relay station 100, at least for transmission and reception of a radio signal. That is, for example, the mobile station 200 includes a wireless communication unit for transmitting or receiving a radio signal in blocks individually divided in at least one of a time domain, a frequency domain, a code domain, and a space domain, and a communication control unit for controlling transmission and reception of the radio signal of the wireless communication unit. The communication control unit of the mobile station 200, for example, can cause the wireless communication unit to transmit, in one block, a plurality of data relayed by the relay station 100 or cause the wireless communication unit to transmit, in one block, a plurality of data to be relayed by the relay station 100.

5. CONCLUSION

According to the relay station 100 according to the embodiments described in this disclosure, the communication resources are dynamically integrated or divided in relay communication, or the arrangement of the communication resources is changed. For example, when the relay destination is common, communication resources used to relay a plurality of data directed to the relay destination can be integrated. Further, when relay destinations are different, data transmitted in one communication resource can be relayed in a plurality of communication resources divided for respective relay destinations, respectively. Thus, use efficiency of the communication resources of the overall system is improved.

Further, according to the relay station 100 in the embodiment, when link quality between the relay station and the relay destination is higher than link quality between the relay station and the relay source, communication resources used for relay communication may be integrated. Meanwhile, the link quality between the relay station and the relay destination is lower than link quality between the relay station and the relay source, communication resources used for relay communication can be divided into a plurality of communication resources. Thus, a situation in which communication resources are unnecessarily consumed when the link quality is higher or the communication resources are insufficient when the link quality is low is less likely to occur.

In the above-described embodiment, the example in which the communication resources are individually divided in both the time domain and the frequency domain has been mainly described. This implies that the technique according to the present invention can be applied even to resource allocation based on units of resource blocks (e.g., in LTE) to which a technique of increasing or decreasing a data frame length in a time direction is difficult to simply apply like a conventional frame aggregation technique. However, the present invention is not limited to such an example and the technique according to the present invention may also be applied to a case in which communication resources are divided in a domain other than the time domain and the frequency domain (e.g., a code domain or a space domain).

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

REFERENCE SIGNS LIST

10 Base station
100 Relay station
110 Wireless communication unit
120 Demodulation unit
130 Decoding unit
140 Storage unit
150 Encoding unit
160 Modulation unit
170 Quality measurement unit
180 Communication control unit
200 Mobile station

The invention claimed is:

1. A relay station for relaying a radio signal between a base station and a mobile station, the relay station comprising:
   wireless communication circuitry configured to transmit or receive a radio signal in blocks individually divided in at least one of a time domain, a frequency domain, a code domain, and a space domain;
   communication control circuitry configured to cause the wireless communication circuitry to transmit, in one block, data contained in two or more radio signals respectively received in different blocks by the wireless communication circuitry,
   wherein an area occupied by the one block, containing the data contained in the two or more radio signals received in the different blocks, in at least two domains that the one block, containing the data contained in the two or more radio signals received in the different blocks, is individually divided in is equal to an area occupied by each of the different blocks in at least two domains that the different blocks are individually divided in.

2. The relay station according to claim 1, wherein the communication control circuitry is configured to cause the wireless communication circuitry to transmit, in the one block, data contained in the radio signals for which relay destinations are common among the radio signals respectively received in the different blocks by the wireless communication circuitry.

3. The relay station according to claim 1, further comprising:
measurement circuitry configured to measure link quality between the relay station and the base station and link quality between the relay station and the mobile station,
wherein the communication control circuitry is configured to cause the wireless communication circuitry to transmit, in the one block, data contained in the two or more radio signals when the link quality between the relay station and the relay destination is higher than the link quality between the relay station and the relay source.

4. The relay station according to claim 1, wherein the blocks are individually divided in both the time domain and the frequency domain.

5. The relay station according to claim 1, wherein the communication control circuitry is configured to change the number of blocks to be used when causing the wireless communication circuitry to transmit the data contained in the radio signal, according to a type of an application associated with each radio signal.

6. The relay station according to claim 5, wherein the communication control circuitry is configured to cause the wireless communication circuitry to transmit data contained in a radio signal related to an application requiring real time, using as many blocks as in reception.

7. The relay station according to claim 1, wherein the two or more radio signals are radio signals respectively transmitted from different relay sources.

8. The relay station according to claim 1, wherein the communication control circuitry is configured to determine which blocks to use to cause the wireless communication circuitry to transmit the data contained in the two or more radio signals based on scheduling information received from the base station by the wireless communication circuitry.

9. The relay station according to claim 1, wherein the communication control circuitry is configured to determine the number of blocks to be used when causing the wireless communication circuitry to transmit the data contained in the two or more radio signals, based on a scheduling request received from the mobile station by the wireless communication circuitry.

10. The relay station according to claim 1, wherein when transmitting the data contained in the two or more radio signals in the one block, the wireless communication circuitry is configured to encode and modulate data obtained by demodulating and decoding the two or more radio signals according to different encoding schemes or different modulation schemes and transmits the resultant data.

11. The relay station according to claim 1, wherein the communication control circuitry is configured to receive scheduling information on a control channel provided for the mobile station or on a relay control channel provided for the relay station.

12. A relay method for relaying a radio signal between a base station and a mobile station using a relay station, wherein the radio signal is transmitted in blocks individually divided in at least one of a time domain, a frequency domain, a code domain, and a space domain, and the relay method comprises the steps of:
receiving, by circuitry of the relay station, two or more radio signals in different blocks; and
transmitting, by the circuitry of the relay station, data contained in the two or more received radio signals in one block,
wherein an area occupied by the one block, containing the data contained in the two or more radio signals received in the different blocks, in at least two domains that the one block, containing the data contained in the two or more radio signals received in the different blocks, is individually divided in is equal to an area occupied by each of the different blocks in at least two domains that the different blocks are individually divided in.

13. A wireless communication device for transmitting and receiving a radio signal to and from one or more other wireless communication devices via a relay station, the wireless communication device comprising:
wireless communication circuitry configured to transmit or receive a radio signal in blocks individually divided in at least one of a time domain, a frequency domain, a code domain, and a space domain; and
communication control circuitry configured to cause the wireless communication circuitry to receive data contained in two or more radio signals transmitted in different blocks from the one or more other wireless communication devices to the relay station, the data being data contained in the radio signal relayed in one block by the relay station,
wherein an area occupied by the one block, containing the data contained in the two or more radio signals transmitted in the different blocks, in at least two domains that the one block, containing the data contained in the two or more radio signals transmitted in the different blocks, is individually divided in is equal to an area occupied by each of the different blocks in at least two domains that the different blocks are individually divided in.

14. A relay station for relaying a radio signal between a base station and a mobile station, the relay station comprising:
wireless communication circuitry configured to transmit or receive a radio signal in blocks individually divided in at least one of a time domain, a frequency domain, a code domain, and a space domain; and
communication control configured to cause the wireless communication circuitry to transmit, in two or more different blocks, data contained in the radio signal received in one block by the wireless communication circuitry,
wherein an area occupied by the one block, containing the data transmitted in the two or more different blocks, in at least two domains that the one block, containing the data transmitted in the two or more different blocks, is individually divided in is equal to an area occupied by each of the different blocks in at least two domains that the different blocks are individually divided in.

15. The relay station according to claim 14, wherein when the data contained in the radio signal received in one block by the wireless communication circuitry contains two or more data for which relay destinations are different, the communication control circuitry is configured to cause the wireless communication circuitry to transmit the two or more data in two or more different blocks.

16. The relay station according to claim 14, further comprising:
measurement circuitry configured to measure link quality between the relay station and the base station and link quality between the relay station and the mobile station,
wherein the communication control circuitry is configured to cause the wireless communication circuitry to transmit, in the two or more blocks, the data contained in the radio signal received in the one block when link quality between the relay station and the relay destination is lower than link quality between the relay station and the relay source.

17. The relay station according to claim 14, wherein the blocks are individually divided in both the time domain and the frequency domain.

18. A relay method for relaying a radio signal using a relay station between a base station and a mobile station, wherein the radio signal is transmitted in blocks individually divided in at least one of a time domain, a frequency domain, a code domain, and a space domain, and the relay method comprises the steps of:
  receiving, by circuitry of the relay station, the radio signal in one block; and
  transmitting, by the circuitry of the relay station, data contained in the received radio signal in two or more different blocks,
  wherein an area occupied by the one block, containing the data transmitted in the two or more different blocks, in at least two domains that the one block, containing the data transmitted in the two or more different blocks, is individually divided in is equal to an area occupied by each of the different blocks in at least two domains that the different blocks are individually divided in.

19. A wireless communication device for transmitting and receiving a radio signal to and from one or more other wireless communication devices via a relay station, the wireless communication device comprising:
  wireless communication circuitry configured to transmit or receive the radio signal in blocks individually divided in at least one of a time domain, a frequency domain, a code domain, and a space domain; and
  communication control circuitry configured to cause the wireless communication circuitry to transmit, in one block, two or more data to be respectively relayed in different blocks to the one or more other wireless communication devices by the relay station, to the relay station,
  wherein an area occupied by the one block, containing the two or more data to be relayed in the different blocks, in at least two domains that the one block, containing the two or more data to be relayed in the different blocks, is individually divided in is equal to an area occupied by each of the different blocks in at least two domains that the different blocks are individually divided in.

* * * * *